United States Patent
Mavrikakis et al.

(10) Patent No.: US 10,928,306 B2
(45) Date of Patent: Feb. 23, 2021

(54) FUNCTIONAL SURFACES FOR LIQUID CRYSTAL-BASED DETECTION OF CHLORINE GAS

(71) Applicant: Wisconsin Alumni Research Foundation, Madison, WI (US)

(72) Inventors: Emmanouil Mavrikakis, Middleton, WI (US); Nicholas Abbott, Madison, WI (US); Tibor Szilvasi, Madison, WI (US); Nanqi Bao, Madison, WI (US); Huaizhe Yu, Anshan (CN)

(73) Assignee: Wisconsin Alumni Research Foundation, Madison, WI (US)

( * ) Notice: Subject to any disclaimer, the term of this patent is extended or adjusted under 35 U.S.C. 154(b) by 218 days.

(21) Appl. No.: 16/244,194

(22) Filed: Jan. 10, 2019

(65) Prior Publication Data
US 2019/0212254 A1    Jul. 11, 2019

Related U.S. Application Data

(60) Provisional application No. 62/615,493, filed on Jan. 10, 2018.

(51) Int. Cl.
| | |
|---|---|
| *G01N 21/21* | (2006.01) |
| *G01N 21/78* | (2006.01) |
| *G01N 31/22* | (2006.01) |
| *G01N 21/88* | (2006.01) |
| *C09K 19/00* | (2006.01) |

(Continued)

(52) U.S. Cl.
CPC ............ *G01N 21/21* (2013.01); *C09K 19/00* (2013.01); *G01N 21/783* (2013.01);
(Continued)

(58) Field of Classification Search
CPC .... G01N 21/21; G01N 21/783; G01N 31/223; G01N 21/8806; G01N 2021/8848;
(Continued)

(56) References Cited

U.S. PATENT DOCUMENTS

2007/0004046 A1    1/2007   Abbott
2012/0288951 A1    11/2012  Acharya et al.
(Continued)

OTHER PUBLICATIONS

James E. Hallett, Dominic W. Hayward, Thomas Arnold, d Paul Bartlett and Robert M. Richardson. X-ray reflectivity reveals ionic structure at liquid crystal-aqueous interfaces. Soft Matter, 13, 5535 (Year: 2017).*

(Continued)

*Primary Examiner* — Jennifer Wecker
*Assistant Examiner* — Jonathan Bortoli
(74) *Attorney, Agent, or Firm* — Boyle Fredrickson S.C.

(57) ABSTRACT

Liquid crystal-based devices for detecting chlorine in a sample and methods of using such devices to detect chlorine are disclosed. Such devices have a substrate surface that includes either metal cations or a metal that is in contact with a composition that includes a liquid crystal. When the device is contacted with a sample that contains chlorine, an observed change in the orientational ordering of the liquid crystal signals the presence of the chlorine. In the absence of chlorine, no change in orientational ordering occurs.

20 Claims, 31 Drawing Sheets
(31 of 31 Drawing Sheet(s) Filed in Color)

(51) Int. Cl.
*C09K 19/30* (2006.01)
*G01N 21/17* (2006.01)

(52) U.S. Cl.
CPC ....... *G01N 21/8806* (2013.01); *G01N 31/223* (2013.01); *C09K 2019/3027* (2013.01); *C09K 2219/17* (2013.01); *G01N 2021/1704* (2013.01); *G01N 2021/8848* (2013.01)

(58) Field of Classification Search
CPC ............ G01N 2021/1704; C09K 19/00; C09K 2019/3027; C09K 2219/17
See application file for complete search history.

(56) References Cited

U.S. PATENT DOCUMENTS

| | | |
|---|---|---|
| 2016/0018371 A1 | 1/2016 | Acharya et al. |
| 2016/0025636 A1* | 1/2016 | Abbott .................. G01N 21/75 422/69 |
| 2016/0274084 A1 | 9/2016 | Acharya et al. |
| 2017/0212088 A1 | 7/2017 | Acharya et al. |

OTHER PUBLICATIONS

L.T. Roling et al.,"Towards first-principles molecular design of liquid crystal-based chemoresponsive systems," Nature Communication, vol. 7, 2016, pp. 1-7, published Nov. 2, 2016.
Chemical Processing Staff, "Liquid Crystals Strengthen Sensor Accuracy," Chemical Processing, 2017, Putman Media, Schaumberg, IL, pp. 1-7, published Jan. 16, 2017.

* cited by examiner

FUNCTIONAL SURFACES FOR LIQUID CRYSTAL-BASED DETECTION OF CHLORINE GAS

CROSS REFERENCE TO RELATED APPLICATIONS

This application claims the benefit of U.S. provisional Application No. 62/615,493, filed on Jan. 10, 2018. This provisional application is incorporated by reference herein in its entirety.

STATEMENT REGARDING FEDERALLY SPONSORED RESEARCH OR DEVELOPMENT

This invention was made with government support under DMR1435195 awarded by the National Science Foundation, and W911NF-13-P-0030 and W911NF-17-C-0035 awarded by the ARMY/ARO. The government has certain rights in the invention.

FIELD OF THE INVENTION

The disclosure relates generally to liquid crystal-based methods and devices for detecting chlorine gas.

BACKGROUND OF THE INVENTION

Chlorine ($Cl_2$) is a yellowish-green gas having a pungent smell that is used in a range of industrial applications, such as in chemical oxidation, in bleaching paper pulp, and in disinfecting sewage and drinking water. Chlorine is a toxic pulmonary irritant with intermediate water solubility, and chlorine exposure can cause a number of health problems, including skin infections, liver damage, and psychological disorders. Because chlorine is commonly used, can be generated accidentally by the reduction of chloride-containing compounds, and can be used as an agent of warfare (as demonstrated recently in Syria), the detection of ambient chlorine is important for protecting human health.

Chlorine exposure is highly regulated, with the Occupational Health and Safety Administration (OSHA) setting a maximum short-term workplace $Cl_2$ exposure limit at 1 ppm $Cl_2$ for 15 minutes. Enforcing such limits requires accurate and readily deployable methods of detecting chlorine in the environment. Ideally, chlorine sensors would be lightweight, be made of relatively inexpensive materials, and could operate without electric power. Chlorine sensors having these characteristics could be designed to be wearable, in order protect workers from chlorine gas in the workplace. Alternatively, chlorine sensors having these characteristics could be readily incorporated into unmanned aerial vehicles (UAVs) or unmanned ground vehicles (UGVs), facilitating chlorine detection on the battlefield or in an industrial plant without risk to human operators.

Current technologies used for chlorine detection include gas chromatography, chemical tubes, and electrical sensors, each of which can detect ambient chlorine only at relatively high concentrations (i.e., at high ppm levels). Other chlorine detection methods, such as the use of complex metal oxide thin film, can detect chlorine at relatively low concentrations (i.e., at low ppm). However, such methods may work only at high temperatures. For example, complex metal oxide thin films can only operate as chlorine detectors at temperatures of about 300° C. Furthermore, existing chlorine sensing technologies are too bulky and heavy to be integrated into a wearable badge-like sensor or to be placed onto a robotic device such as a mini UAV or UGV.

Liquid crystal (LC)—based sensor devices for detecting targeted agents are well-known in the art. Such devices may include thin films of nematic LCs supported on a chemically functionalized surface. Interactions between the functionalized surface and LCs result in long-range alignment of the LC molecules, which can be readily transduced via a range of methods, including optical and electrical methods. A preferred embodiment of an optical method is to probe the LC transmission of polarized light.

Observed changes in the alignment of the LC molecules may signal the presence of a targeted agent. For example, U.S. Pat. Pub. No. 2007/0004046, which is incorporated by reference herein in its entirety, discloses that dimethylmethylphosphonate, or DMMP, induces a change from a homeotropic to a planar alignment in the orientation of 4-pentyl-4'-cyanobiphenyl (5CB) films or other nitrile containing LCs such as E7, in contact with aluminum (III) perchlorate salts decorated on solid surfaces.

Liquid crystal-based sensors are compact, lightweight, made of relatively inexpensive materials, and can operate without electrical power, making them ideal for the creation of wearable sensors, for introducing chemical sensor capabilities into UAVs and UGVs, as well for creating massive (and relatively low-cost) sensor networks. A wide range of chemical analytes can be detected using LC-based sensors, including nerve and blister agents, $NO_2$, $H_2S$, and a range of volatile organic compounds (VOCs). However, no previously known LC sensor design can be used to detect chlorine.

Accordingly, there is a need in the art for an improved LC-based sensor design that be used to successfully detect chlorine.

BRIEF SUMMARY

We have developed compositions of matter that permit liquid crystal-based sensing of chlorine gas, along with methods that permit identification of preferred compositions of matter for design of optimized liquid crystal-based sensors of chlorine. The disclosed devices and methods were developed out of combined computational and experimental approaches, based on quantum mechanics and experiments with LCs adsorbed on solid surfaces. We used this methodology to computationally screen solid surfaces for use in LC sensors and then to quickly but very accurately experimentally evaluate the computationally derived predictions. This approach has led us to discover two distinct designs of solid surfaces that permit the successful detection of chlorine using LCs.

In a first approach, redox properties of metal cations were screened for their ability to be oxidized by chlorine but not oxidized by air. We performed computational chemistry calculations to determine if candidate metal cations and their oxidized products would exhibit differential interactions with LCs. This approach led us to conclude that exemplary substrate surfaces comprising $Mn^{2+}$ cations would be excellent candidates for chlorine detection. This prediction was experimentally validated.

Notably, this approach is not limited to surfaces containing $Mn^{2+}$ cations. Instead, it is an exemplary embodiment of a broader detector design featuring LC on a metal cation decorated surface, where the metal cation (i) binds the LC strongly to cause homeotropic alignment, (ii) is not oxidized by air, and (iii) can be oxidized by chlorine gas, and in the oxidized state does not bind LC sufficiently strongly to maintain the homeotropic alignment of the LC. In the presence of chlorine, the metal cation is converted to its oxidized state, and the LC changes its orientational ordering from homeotropic to planar. This change signals the presence of the chlorine.

In a second approach, metal surfaces were computationally screened for interactions with chlorine gas. Computations predict that chlorine undergoes a dissociative adsorption of Au surfaces, binding to these surfaces more strongly than LCs. Experiments performed with gold films and LCs revealed that the LCs respond to the interactions of chlorine with gold surfaces in the presence of a sensitizer molecule having a carboxylic acid or carboxylate terminus.

As in the first approach, this approach is not limited to gold surfaces or by the exemplary sensitizer molecules disclosed herein. Instead, this approach is an exemplary embodiment of a broader detection device design in which a LC composition containing a sensitizer molecule that facilitates bonding of the LC to the surface is placed onto a metal surface such that it binds to the metal surface to assume a homeotropic alignment. Despite the presence of the sensitizer molecule, the LC composition binds more weakly onto a metal surface onto which chlorine is dissociatively adsorbed, and thus the homeotropic alignment cannot be maintained. In the presence of chlorine, chlorine atoms are dissociatively adsorbed onto the metal surface, and the LC changes its orientational ordering from homeotropic to planar. This change signals the presence of the chlorine.

Accordingly, in a first aspect, this disclosure encompasses a device for detecting chlorine gas. The device includes a substrate having a surface that includes either of two possible surface designs. In a first design, the surface includes one or more metal cations capable of binding a liquid crystal strongly enough to cause homeotropic ordering of the liquid crystal in contact with the substrate surface. The one or more metal cations have an oxidized state that is not capable of binding the liquid crystal strongly enough to cause homeotropic ordering of a liquid crystal in contact with the substrate surface. The one or more metal cations are capable of being oxidized to this oxidized state by chlorine gas, while not being capable of being oxidized to this oxidized state by the oxygen in air.

In a second design, the surface includes a metal capable of binding a mixture comprising a liquid crystal and a sensitizer molecule strongly enough to cause homeotropic ordering of such a mixture in contact with the substrate surface in the absence of chlorine, but not when chlorine atoms are dissociatively bound to the substrate surface.

In addition to the substrate surface, the device also includes a composition comprising a liquid crystal that is in contact with the substrate surface. In embodiments where the substrate surface includes a metal, the composition further includes the sensitizer molecule. The liquid crystal composition is capable of changing its orientational ordering when $Cl_2$ comes in contact with the substrate surface.

In some embodiments, the one or more metal cations or the metal are the primary active substances on the substrate surface that are capable of facilitating the change of orientational ordering of the liquid crystal upon contact with chlorine.

In some embodiments, the one or more metal cations include $Mn^{2+}$.

In some embodiments, the metal may be a noble metal, such as gold metal.

In some embodiments, the liquid crystal is capable of changing its orientational ordering if it is contacted with a gas composition having a non-zero chlorine gas concentration of 5 ppm or less. In some such embodiments, the liquid crystal is capable of changing its orientational ordering if it is contacted with a gas composition having a non-zero chlorine gas concentration of 1 ppm or less.

In some embodiments, the liquid crystal does not change its orientational ordering if it is contacted with a gas composition that does not include chlorine gas.

In some embodiments, the device further includes a gas composition that is in contact with the liquid crystal-containing composition. In some such embodiments, the gas composition does not include chlorine gas. In some such embodiments, the liquid crystal exhibits homeotropic orientational ordering relative to the substrate surface. In some such embodiments, the gas composition may include other gases, such as DMMP, formaldehyde, ethylene oxide, or ammonia.

In other such embodiments, the gas composition includes chlorine gas. In some such embodiments, the liquid crystal exhibits planar orientational ordering relative to the substrate surface. In some such embodiments, the substrate surface includes $Mn^{2+}$ cations, and the substrate surface further includes $Mn^{4+}$ cation. The $Mn^{4+}$ cation may be incorporated into $MnO_2$. In other such embodiments, the substrate surface includes a metal, and the substrate surface further includes chlorine atoms that are dissociatively adsorbed onto the substrate surface. In some such embodiments, the metal is a noble metal, such as gold metal.

In some embodiments, the liquid crystal is 5CB (4-n-pentyl-4'-cyanobiphenyl), 8CB (4-cyano-4'octylbiphenyl), PRD (4-(4-pentylphenyl)-pyridine), a PCH series LC, such as PCH5 (4-(trans-4'pentylcyclohexyl)-benzonitrile), or include one or more fluorinated mesogens, such as TL205 (a mixture of cyclohexane-fluorinated biphenyls and fluorinated terphenyls) or TL205 doped with PRD.

In some embodiments, the device further includes a means for observing the orientational ordering of the liquid crystal.

In some embodiments, the substrate surface includes one or more metal cations. In some such embodiments, the metal cations are immobilized on the substrate surface. In some embodiments, the metal cations are part of one or more salts disposed onto the substrate surface that further include one or more anions. In some embodiments, the metal cations include $Mn^{2+}$.

In some embodiments, the gas composition, the liquid crystal-containing composition, or both, include water.

In some embodiments, the substrate surface includes a metal (a non-limiting example is a noble metal, such as gold metal). In some such embodiments, the liquid crystal-containing composition further includes a sensitizer molecule that facilitates the binding of the liquid crystal to the metal surface in the absence of dissociatively bound chlorine atoms. In some embodiments, the sensitizing molecule has a carboxylic acid or a carboxylate terminus. In some such embodiments, the sensitizer molecule is a liquid crystal that is modified to include a carboxylic acid or carboxylate terminus. In some such embodiments, the sensitizer molecule is 4'-cyano-4-biphenyl carboxylic acid (CBCA).

In some embodiments, the concentration of the sensitizer molecule within the liquid crystal-containing composition is from about 0.001 mol % to about 5.0 mol % sensitizer molecule. In some such embodiments, the concentration of the sensitizer molecule within the liquid crystal-containing composition is from about 0.001 mol % to about 0.5 mol % sensitizer molecule. In some such embodiments, the concentration of the sensitizer molecule within the liquid crystal-containing composition is from about 0.002 mol % to about 0.3 mol % sensitizer molecule.

In some embodiments where the substrate surface includes a metal, such as gold, the gas composition, the composition comprising the liquid crystal, or both, do not include water.

In a second aspect, this disclosure encompasses a method for detecting the presence of chlorine in a sample. The method includes the steps (a) contacting the liquid crystal in a device as described above with the sample; and (b) observing the orientational ordering of the liquid crystal in the device. An observed change in the orientational ordering of the liquid crystal in the device indicates that chlorine is present in the sample.

In some embodiments, the observed change in orientational ordering that indicates the presence of chlorine in the sample is a change from homeotropic to planar orientational ordering relative to the substrate surface.

In some embodiments, the sample is a gaseous composition. In some embodiments, the gaseous composition is ambient air, dry nitrogen, or dry nitrogen with controlled relative humidity.

In some embodiments, the method further includes the step of quantifying the amount of chlorine in the sample. In performing this step, the quantity of chlorine in the sample may be correlated with the speed or extent of the observed change in orientational ordering.

In some embodiments, the substrate surface of the device includes one or more metal cations, such as $Mn^{2+}$ cations. In some such embodiments, the sample includes water.

In some embodiments where the substrate surface includes $Mn^{2+}$ cations, in cases where chlorine is detected, the chlorine oxidizes $Mn^{2+}$ cations to a higher oxidation state of Mn.

In other embodiments, the substrate surface of the device includes a metal, such as (but not limited to) gold metal or other noble metal. In some such embodiments, the liquid crystal-containing composition in the device further includes a sensitizer molecule that facilitates the binding of the liquid crystal to the metal surface in the absence of dissociatively bound chlorine atoms. In some embodiments, the sensitizer molecule has a carboxylic acid terminus. In some such embodiments, the sensitizer molecule is a liquid crystal that is modified to include a carboxylic acid or a carboxylate terminus. A non-limiting example of such a sensitizer molecule is 4'-cyano-4-biphenyl carboxylic acid (CBCA).

In embodiments where the liquid crystal-containing composition also includes a sensitizer molecule, the concentration of the sensitizer molecule within the composition is from about 0.001 mol % to about 5.0 mol % sensitizer molecule. In some such embodiments, the concentration of the sensitizer molecule within the composition is from about 0.001 mol % to about 0.5 mol % sensitizer molecule. In some such embodiments, the concentration of the sensitizer molecule within the liquid crystal-containing composition is from about 0.002 mol % to about 0.3 mol % sensitizer molecule.

In some embodiments where the substrate surface includes a metal, such as gold, the sample may or may not include water.

In some embodiments where the substrate surface includes a metal, chlorine is detected, and when the chlorine contacts the substrate surface, one or more chlorine molecules dissociatively adsorb onto the substrate surface.

In a third aspect, this disclosure encompasses a method for detecting the presence of chlorine in a sample. The method includes the steps of (a) contacting a substrate surface that includes one or more metal cations or a metal with the sample; (b) contacting the substrate surface with a composition that contains a liquid crystal; and (c) observing the orientational ordering of the liquid crystal in the device. An observed change in the orientational ordering of the liquid crystal from the expected orientational ordering of the liquid crystal in the absence of chlorine indicates that chlorine is present in the sample.

In embodiments where the substrate surface includes one or more metal cations, the metal cations are capable of binding a liquid crystal strongly enough to cause homeotropic ordering of the liquid crystal in contact with the substrate surface and have an oxidized state that is not capable of binding the liquid crystal strongly enough to cause homeotropic ordering of a liquid crystal in contact with the substrate surface. Furthermore, the one or more metal cations are capable of being oxidized to the oxidized state by chlorine gas, and are not capable of being oxidized to the oxidized state by the oxygen in air.

In embodiments where the substrate surface includes a metal, the metal is capable of binding a mixture comprising a liquid crystal and a sensitizer molecule strongly enough to cause homeotropic ordering of such a mixture in contact with the substrate surface in the absence of chlorine, but not when chlorine atoms are dissociatively bound to the substrate surface. Accordingly, the liquid crystal used in such embodiments also include the sensitizer molecule.

In some embodiments, step (a) occurs before step (b), and the sample is directly contacted with the substrate surface. In other embodiments, step (b) occurs before step (a), and the sample is indirectly contacted with the substrate surface through contact with the liquid crystal-containing composition.

In some embodiments, the observed change in orientational ordering that indicates the presence of chlorine in the sample is a change from homeotropic to planar orientational ordering relative to the substrate surface.

In some embodiments, the sample is a gaseous composition. In some such embodiments, the gaseous composition is ambient air, dry nitrogen, or dry nitrogen with controlled relative humidity.

Some embodiments further include the step of quantifying the amount of chlorine in the sample, where the quantity of chlorine in the sample is correlated with the speed or extent of the observed change in orientational ordering.

In some embodiments, the substrate surface includes one or more metal cations, such as $Mn^{2+}$. In some such embodiments, the sample includes water.

In some embodiments where the substrate surface includes $Mn^{2+}$ cations, chlorine is detected, and when the chlorine contacts the substrate surface, the $Mn^{2+}$ cations are oxidized to a higher oxidation state of Mn.

In some embodiments, the substrate surface includes a metal, such as (but not limited to) gold metal or other noble metal. In some such embodiments, the liquid crystal-containing composition further includes a sensitizer molecule that facilitates the binding of the liquid crystal to the metal surface in the absence of dissociatively bound chlorine atoms. In some embodiments, the sensitizer molecule has a carboxylic acid or a carboxylate terminus. In some such embodiments, the sensitizer molecule is a liquid crystal that is modified to include the carboxylic acid or a carboxylate terminus. In one such embodiments, the sensitizer molecule is 4'-cyano-4-biphenylcarboxylic acid (CBCA).

In some embodiments, the concentration of the sensitizer molecule within the liquid crystal-containing composition is from about 0.001 mol % to about 5.0 mol % sensitizer molecule. In some such embodiments, the concentration of the sensitizer molecule within the liquid crystal-containing composition is from about 0.001 mol % to about 0.5 mol % sensitizer molecule. In some such embodiments, the concentration of the sensitizer molecule within the liquid crystal-containing composition is from about 0.002 mol % to about 0.3 mol % sensitizer molecule.

In some embodiments, the sample does not include water.

In some embodiments where the substrate surface includes a metal, such as gold, and chlorine is detected, when the chlorine contacts the substrate surface, one or more chlorine molecules dissociatively adsorb onto the substrate surface.

Further objects, features and advantages of the invention will be apparent from the following detailed description when taken in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosure will be better understood and features and aspects beyond those set forth above will become apparent when considering the following detailed description. The detailed description makes reference to the following figures.

Figure 1A:
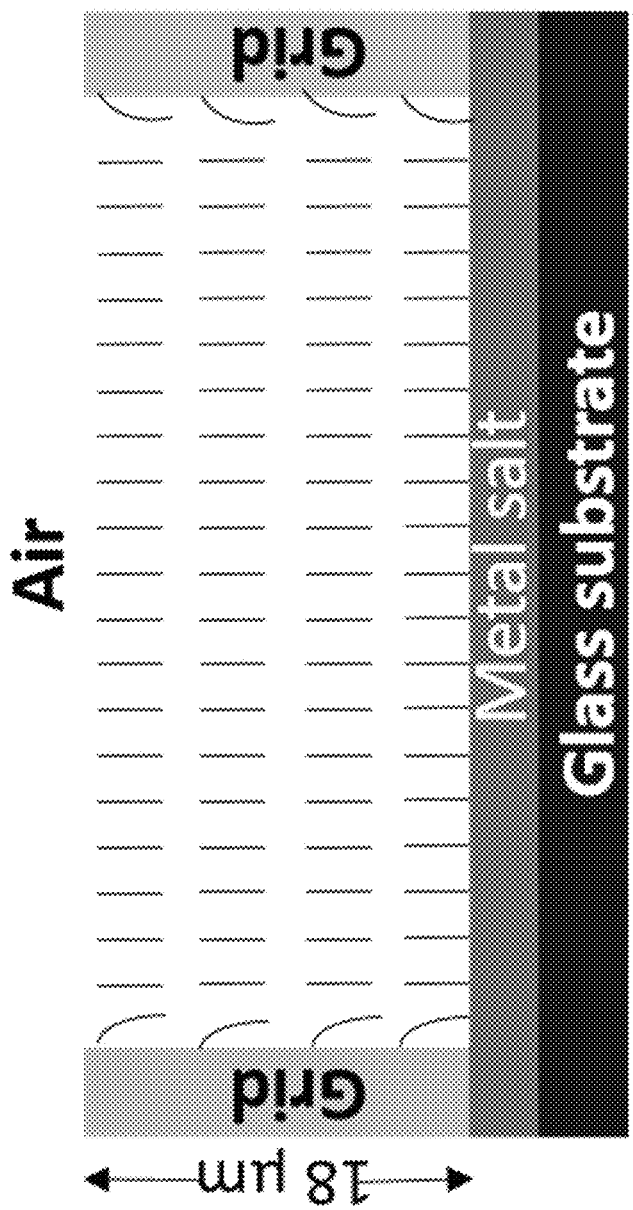
FIG. 1A is a side view schematic illustration of the experimental setup and director profile of liquid crystal (4-n-pentyl-4'-cyanobiphenyl; 5CB) placed on a metal salt disposed on a glass substrate and contained within a transmission electron microscopy (TEM) grid.

While the invention is susceptible to various modifications and alternative forms, specific embodiments are shown by way of example in the drawings and description. However, these descriptions of specific embodiments are not intended to limit the invention to the particular forms disclosed. Instead, the intention is to cover all modifications, equivalents, and alternatives falling within the spirit and scope defined by the appended claims.

DETAILED DESCRIPTION

I. In General

This invention is not limited to the particular methodology, protocols, materials, and reagents described, as these may vary. The terminology used in this disclosure is for the purpose of describing particular embodiments only, and is not intended to limit the scope of the present invention, which will be limited only by the language of the appended claims.

As used in this disclosure, the terms "one or more" and "at least one" can be used interchangeably. The terms "comprising", "including", and "having" can also be used interchangeably.

Unless defined otherwise, all technical and scientific terms used in this disclosure have the same meanings as commonly understood by one of ordinary skill in the art to which this disclosure belongs. All publications and patents specifically mentioned in this disclosure are incorporated by reference for all purposes, including for describing and disclosing the chemicals, instruments, statistical analysis and methodologies that are reported in the publications that might be used in connection with the disclosed methods and devices. All references cited in this disclosure are to be taken as indicative of the level of skill in the art.

II. THE INVENTION

Nematic liquid crystals are materials with mobilities characteristic of liquids, but that are capable of organizing over distances of hundreds of micrometers. Past theoretical and experimental studies have established that the orientations of liquid crystals near an interface to a confining medium are dictated by the chemical and topographical structure of that interface. This so-called anchoring of liquid crystals by surfaces has found widespread use in the display industry and underlies the principles that are being developed for the detection of molecular and biomolecular events at interfaces. Specifically, a change in the chemical or topographical structure of an interface brought about by a chemical or biological species at a surface can give rise to new orientations of liquid crystals in contact with that surface. As liquid crystals are birefringent, these new orientations can be visualized under simple polarized microscopy.

This disclosure is based on the inventors' discovery that substrate surfaces incorporating either metal cations, such as $Mn^{2+}$, or a metal, such as gold, can be used in combination with a liquid crystal-containing composition to detect chlorine in a sample. To our knowledge, this is the first report of using liquid crystal-based detection sensors or methods for detecting chlorine.

Specifically, either before or after the substrate surface is exposed to a sample that may contain chlorine, the liquid crystal-containing composition is disposed onto the substrate surface. If the liquid crystal-containing composition is disposed onto the substrate surface before exposure to the sample, the substrate surface may be exposed to the sample indirectly by exposure to the liquid crystal.

In the absence of chlorine, the liquid crystal-containing composition exhibits relatively strong binding (and thus homeotropic orientational ordering) to the substrate surface. In the case of a gold substrate surface, homeotropic orientational ordering may be facilitated by the presence of a sensitizer molecule in the liquid crystal-containing composition. When any chlorine present in the sample contacts the substrate surface, the binding strength of the liquid crystal to the surface is substantially reduced, either by the oxidation of the metal cation (in a non-limiting example, oxidation of $Mn^{2+}$ to $MnO_2$), or by the adsorption of dissociated chlorine atom onto the metal (in a non-limiting example, onto a noble metal, such as gold). This results in a detectable change of the orientational ordering of the liquid crystal (typically from homeotropic to planar), and this change signals the presence of chlorine in the sample.

The term "liquid crystal," as used in this disclosure, refers to an organic composition in an intermediate or mesomorphic state between solid and liquid. Suitable liquid crystals for use in the present invention include, but are not limited to, thermotropic liquid crystals. The disclosed methods and devices may employ polymeric liquid crystals, composite materials comprising particles and liquid crystals, or polymers and liquid crystals, as well as elastomeric liquid crystals. The disclosed methods and devices may also use liquid crystalline gels, including colloid-in-liquid crystal gels and molecular liquid crystalline gels containing, for example, gelators comprised of derivatives of amino acids. In certain embodiments of the disclosed methods and devices, the liquid crystal phase can include a low molecular weight liquid crystal, a liquid crystal elastomer, a liquid crystalline gel, or a liquid crystal droplet. The liquid crystal may also contain a chiral additive to create a cholesteric phase.

An example of a liquid crystalline elastomer is synthesized from the mesogen $M_4OCH_3$ and polymethylhydrosiloxane, according to A. Komp and coworkers "A versatile preparation route for thin free standing liquid single crystal elastomers" *Macromol. Rapid Commun*, 26: 813-818, 2005. Other LC elastomers suitable for use in the current disclosure are described by Deng in "Advances in liquid crystal elastomers" (*Progress in Chemistry*, 18 (10): 1352-1360, 2006), and in the documents cited by Deng. The scope of this disclosure also includes the use of liquid crystalline hydrogels, as described by Weiss, F. and Finkelmann H. in *Macromolecules;* 37(17); 6587-6595, 2004, and in the documents cited by Weiss and Finkelmann. Other embodiments use a composite comprising a dispersion of solid particulates, such as but not limited to microspheres, mixed with liquid crystal. Such composites are known by those skilled in the art to form a gel.

Other classes of liquid crystals that may be used in accordance with the disclosed devices and methods include, but are not limited to: polymeric liquid crystals, thermotropic liquid crystals, lyotropic liquid crystals, columnar liquid crystals, nematic discotic liquid crystals, calamitic nematic liquid crystals, ferroelectric liquid crystals, discoid liquid crystals, liquid crystal mixtures, bent-core liquid crystals, liquid crystals that are achiral to which a chiral sensitizer molecule was added, and cholesteric liquid crystals. Examples of just some of the liquid crystals that may be used are shown in Table 1. Additional non-limiting examples include 4-(4-pentylphenyl)-pyridine (PRD), PCH series LCs, such as PCH5 (4-(trans-4'pentylcyclohexyl)-benzonitrile), and fluorinated mesogens, such as TL205 (a mixture of cyclohexane-fluorinated biphenyls and fluorinated terphenyls). In some embodiments, the TL205 may be doped with PRD. In some embodiments, the liquid crystal is a nematic CB series liquid crystal, such as 4-pentyl-4'-cyanobiphenyl (5CB):

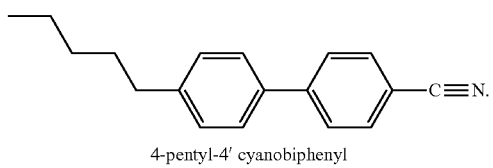

4-pentyl-4' cyanobiphenyl

TABLE 1

Molecular Structure of Mesogens Suitable for Use in the Disclosed Methods and Devices.

| Mesogen | Structure |
|---|---|
| Anisaldazine | $CH_3-O-C_6H_4-CH=N-N=CH-C_6H_4-O-CH_3$ |
| NCB | $C_nH_{2n+1}-C_6H_4-C_6H_4-CN$ |
| CBOOA | $C_9H_{19}-O-C_6H_4-N=CH-C_6H_4-CN$ |
| Comp A | $C_7H_{15}-C_6H_{10}-C_6H_4-COO-C_6H_4-NCS$ |
| Comp B | $C_8H_{17}-O-C_6H_4-O-CO-C_6H_4-O-CH_2-C_6H_4-CN$ |
| $DB_7NO_2$ | $C_7H_{15}-C_6H_4-O-CO-C_6H_4-O-CO-C_6H_4-NO_2$ |
| DOBAMBC | $C_{10}H_{21}-O-C_6H_4-CH=N-C_6H_4-CH=CH-COO-CH_2-CH(CH_3)(C_2H_5)$ |
| nOm<br>n = 1, m = 4: MBBA<br>n = 2, m = 4: EBBA | $C_nH_{2n+1}-O-C_6H_4-CH=N-C_6H_4-C_mH_{2m+1}$ |
| nOBA<br>n = 8: OOBA<br>n = 9: NOBA | $C_nH_{2n+1}-O-C_6H_4-COOH$ |
| nmOBC | $C_nH_{2n+1}-O-CO-C_6H_4-C_6H_4-O-C_mH_{2m+1}$ |
| nOCB | $C_nH_{2n+1}-O-C_6H_4-C_6H_4-CN$ |
| nOSI | $C_nH_{2n+1}-O-C_6H_4-C_6H_4-COO-C_6H_4-CH_2-CH(CH_3)(C_2H_5)$ |
| 98P | $C_3H_7-[CH_2(CH_3)]_5-O-C_6H_4-C_4H_2N_2-C_8H_{17}$ |
| PAA | $CH_3-O-C_6H_4-N=N(O)-C_6H_4-O-CH_3$ |
| PYP906 | $C_9H_{19}-C_4H_2N_2-C_6H_4-O-C_6H_{13}$ |

TABLE 1-continued

Molecular Structure of Mesogens Suitable for Use in the Disclosed Methods and Devices.

| Mesogen | Structure |
|---|---|
| $\overline{n}$Sm | $C_nH_{2n+1}$—O—⟨⟩—CO—S—⟨⟩—$C_mH_{2m+1}$ |

In embodiments where the substrate surface includes $Mn^{2+}$ ions, the $Mn^{2+}$ may occur with one or more salts that are disposed onto a substrate. Although such salts would also include one or more anions, the nature of the anion is not critical to the inventions. Accordingly, a wide range of Mn (II) salts could be disposed onto the substrate. Non-limiting examples of anions that could be incorporated into such salts include $CH_3COO^-$, $C_5H_7O_2^-$ (acetylacetonate), $Cl^-$, $F^-$, $Br^-$, $SO_4^{2-}$, $NO_3^-$, $ClO_4^-$, $BF_4^-$, $PF6^-$, $SbF_6^-$, or $B(OTeF_5)^-$.

In embodiments where the substrate surface includes $Mn^{2+}$ ions, water is generally required as a reactant in the oxidation of $Mn^{2+}$ that facilitates chlorine detection. Accordingly, in some embodiments, the sample, the liquid crystal-containing composition, or both contain water. However, it may be possible for other reactants, such as ethylene glycol, to take the place of water as a reactant in the oxidation of $Mn^{2+}$.

In embodiments where the substrate surface includes gold metal, a sensitizer molecule may be included along with the liquid crystal in the liquid crystal-containing composition. The sensitizer molecule facilitates the initial binding of the liquid crystal to the gold metal surface, and is miscible in liquid crystal and includes a carboxylic acid or carboxylate terminus. As non-limiting examples, the sensitizer molecule may be any of the mesogens listed in Table 1, where one or more of the terminal moieties is substituted with a carboxylic acid or carboxylate moiety.

The concentration of the sensitizer molecule in the liquid crystal-containing composition can be tuned to maximize the sensitivity and selectivity of chlorine detection. In some embodiments, the sensitizer molecule concentration can range from about 0.001 to about 0.5 mole % sensitizer molecule. As non-limiting examples, the sensitizer molecule concentration may be about 0.001, 0.002, 0.003, 0.004, 0.005, 0.006, 0.007, 0.008, 0.009, 0.010, 0.011, 0.012, 0.013, 0.014, 0.015, 0.016, 0.017, 0.018, 0.019, 0.02, 0.03, 0.04, 0.05, 0.06, 0.07, 0.08, 0.09, 0.10, 0.11, 0.12, 0.14, 0.15, 0.16, 0.17, 0.18, 0.19, 0.20, 0.21, 0.22, 0.23, 0.24, 0.25, 0.26, 0.27, 0.28, 0.29, 0.30, 0.32, 0.34, 0.36, 0.38, 0.4, 0.5, 0.6, 0.7, 0.8, 0.9. 1.0, 1.1, 1.2, 1.3, 1.4, 1.5, 1.6, 1.7, 1.8, 1.9, 2.0, 2.1, 2.2, 2.3, 2.4, 2.5, 2.6, 2.7. 2.8. 2.9. 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9 or 5.0 mole % sensitizer molecule. In some embodiments, the sensitizer molecule concentration may fall within a range having a lower boundary of about 001, 0.002, 0.003, 0.004, 0.005, 0.006, 0.007, 0.008, 0.009, 0.010, 0.011, 0.012, 0.013, 0.014, 0.015, 0.016, 0.017, 0.018, 0.019, 0.02, 0.03, 0.04, 0.05, 0.06, 0.07, 0.08, 0.09, 0.10, 0.11, 0.12, 0.14, 0.15, 0.16, 0.17, 0.18, 0.19, 0.20, 0.21, 0.22, 0.23, 0.24, 0.25, 0.26, 0.27, 0.28, 0.29, 0.30, 0.32, 0.34, 0.36, 0.38, 0.4. 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7. 2.8. 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, or 4.9 mole % sensitizer molecule, and having an upper boundary of about 0.002, 0.003, 0.004, 0.005, 0.006, 0.007, 0.008, 0.009, 0.010, 0.011, 0.012, 0.013, 0.014, 0.015, 0.016, 0.017, 0.018, 0.019, 0.02, 0.03, 0.04, 0.05, 0.06, 0.07, 0.08, 0.09, 0.10, 0.11, 0.12, 0.14, 0.15, 0.16, 0.17, 0.18, 0.19, 0.20, 0.21, 0.22, 0.23, 0.24, 0.25, 0.26, 0.27, 0.28, 0.29, 0.30, 0.32, 0.34, 0.36, 0.38, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7. 2.8. 2.9, 3.0, 3.1, 3.2, 3.3, 3.4, 3.5, 3.6, 3.7, 3.8, 3.9, 4.0, 4.1, 4.2, 4.3, 4.4, 4.5, 4.6. 4.7, 4.8, 4.9 or 5.0 mole % sensitizer molecule.

As used in this disclosure, the term "substrate" refers to an interface upon which another material can be layered or attached. Optionally, a substrate may be a solid surface, but it may also include without limitation a liquid-liquid interface. Solid supports that may form a substrate include, but are not limited to, glass, a metal (including gold), gels, and filter paper, among others. In certain embodiments, the substrate may include a surface that is functionalized to include a moiety that binds to the $Mn^{2+}$ cation or gold metal.

A surface or substrate may be "decorated" with a metal salt (such as a $Mn^{2+}$ salt) by any of many methods known in the art. As a non-limiting example, a self-assembled monolayer (SAM) may applied to the substrate. The SAM may include thiol moieties that may interact with the substrate to anchor the SAM to the substrate. The SAM may also include a carboxylic acid moiety that may interact with the metal cation to localize the metal salt on the substrate. One example of a suitable SAM for practicing the present invention is 11-mercaptoundecanoic acid. However, the use of other suitable SAM's, which are well known in the art, are contemplated. As a second non-limiting example, a salt solution (e.g., a solution of a salt in ethanol) may be "spin-coated" directly onto a substrate.

As is known to those skilled in the art, changes in the orientational order of the liquid crystal can lead to a change in the optical properties of the liquid crystal. Such changes can be detected and quantified by using optical instrumentation such as, but not limited to, plate readers, cameras, scanners, and photomultiplier tubes. Because the dielectric properties of liquid crystals also change with orientational order, measurements of electrical properties of liquid crystals can also be used to report changes in the orientational order of the liquid crystals. Thus a wide range of optical and electrical methods for observing the change in orientational order of liquid crystals is encompassed by this disclosure.

For example, in certain embodiments, the step of observing the orientational ordering of the liquid crystal at the interface is performed by detecting plane polarized light that is passed through the interface or liquid crystal surface. In some such embodiments, the plane polarized light is passed through the interface between crossed polarizers. Homeotropic ordering can be shown by observing the absence of transmitted light between cross-polarizers, and can be confirmed by an interference pattern consisting of two crossed isogyres under conoscopic examination. Planar ordering results in bright colored appearance when viewed between cross-polarizers.

In some embodiments of the disclosed methods and devices, the orientational ordering of the liquid crystal undergoes change over time, as the $Cl_2$ is introduced into the system. Thus, there is a transitional orientational ordering state between the planar orientation (parallel to the LC interface or surface) and the homeotropic orientation (perpendicular to the LC interface or surface). The transitional ordering is indicated by the so-called "tilt angle," which is the angle at which the LC is oriented as compared to the surface normal (a vector perpendicular to the surface). A change in orientation of the LC can also involve a change in the azimuthal orientation.

The following examples are for illustrative purposes only, and are not intended to limit the scope of the invention in any way. Indeed, various modifications of the invention in addition to those shown and described herein will become apparent to those skilled in the art from the foregoing description and the following example and fall within the scope of the appended claims.

III. EXAMPLES

Introduction to the Examples

Although the successful liquid crystal-based detection of chlorine has not been previously reported, liquid crystals (LCs) and the interactions of the LC films with interfaces can be used as a detection scheme to detect other analytes, including gases. To develop a successful detection method for a given analyte, careful consideration must be given to the interactions between the surface and the LC that influence the response of the LC film to the targeted analyte and to other interfering agents.

The alignment of thin films of nematic LCs supported on chemically functionalized surfaces is defined by intermolecular interactions between the surface and the LC. For example, coordination interactions between surfaces decorated with metal salts and nitrile-containing LCs (e.g., 4-cyano-4'-pentylbiphenyl, 5CB) generally result in a homeotropic alignment of the LC (parallel to surface normal) at the metal salt interface. In contrast, when nitrile-containing LCs are disposed on a gold metal surface, a planar alignment (parallel to a plane tangent to the surface) will generally result.

In these examples, we demonstrate two different exemplary liquid crystal-based sensor chemistries for the detection of $Cl_2$. In both approaches, the presence of chlorine on a substrate surface chemically changes the surface in a way that alters the anchoring of the liquid crystal that is disposed onto the surface. This change in anchoring can be detected by a change in the orientational ordering of the liquid crystal, which can be readily detected by a variety of methods known in the art, such as (but not limited to) viewing the liquid crystal through crossed polarizers.

In the first exemplary approach, the substrate surface is functionalized with $Mn^{2+}$. The nitrile moiety of the liquid crystal disposed on the functionalized surface binds to the functionalized surface (e.g., the binding free energy of benzonitrile to $Mn^{2+}$ is $-0.80$ eV), resulting in the liquid crystal exhibiting homeotropic orientational ordering relative to the substrate surface. However, in the presence of $Cl_2$ (but not oxygen or other analytes of interest), the $Mn^{2+}$ is oxidized to $MnO_2$ according to the following half-reaction:

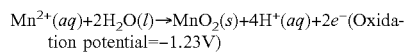

The $Cl_2$ is simultaneously reduced to chloride ion:

The net oxidation-reduction reaction, having a potential of $+0.13$ V, is thermodynamically favored.

The $MnO_2$ formed on the substrate surface has a much lower affinity for the liquid crystal nitrile moiety than the $Mn^{2+}$ from which it was formed (e.g., the binding free energy of benzonitrile to $MnO_2$ is only $-0.40$ eV). Because the binding of the liquid crystal to the substrate surface is substantially weaker after the $Mn^{2+}$ is oxidized to $MnO_2$ (i.e., $Mn^{4+}$), the homeotropic ordering of the liquid crystal cannot be maintained, and the orientational ordering of the liquid crystal changes to planar orientational ordering relative to the substrate surface. Such a change in orientational ordering signals that $Cl_2$ has come in contact with the substrate surface.

In the second exemplary approach, the substrate surface includes gold metal. Liquid crystals such as 5CB generally exhibit planar orientational ordering when disposed on a gold metal surface. However, we determined that when a liquid crystal composition is doped with a small amount of a liquid crystal-like molecule containing a terminal carboxylic acid or carboxylate moiety (in the non-limiting example below, 4-cyano-4-biphenylcarboxylic acid, CBCA; see chemical structure below), the liquid crystal composition exhibits homeotropic orientational ordering relative to the substrate surface. The homeotropic orientational ordering is apparently facilitated by the binding of the CBCA carboxylate form (CBC) to the gold metal substrate.

4-cyano-4-biphenylcarboxylic acid, CBCA:

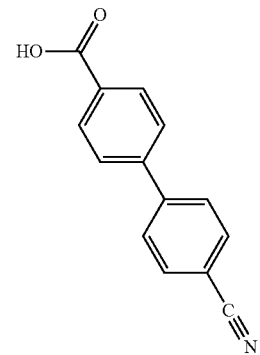 [SMILES: N#Cc1ccc(-c2ccc(C(=O)O)cc2)cc1]

However, when $Cl_2$ contacts the gold substrate surface, it dissociatively adsorbs onto the surface as individual chlorine atoms. The presence of the dissociated chlorine atoms substantially weakens the carboxylate binding strength to the gold substrate surface. Similar to the first approach described above, the homeotropic ordering of the liquid crystal cannot be maintained, and the orientational ordering of the liquid crystal changes to planar orientational ordering relative to the substrate surface. Such a change in orientational ordering signals that $Cl_2$ has come in contact with the substrate surface.

Example 1: Materials and Methods for Examples 2 and 3

Materials

Manganese (II) perchlorate, aluminum (III) perchlorate, chromium (III) perchlorate, and Nickel (II) perchlorate were purchased from Sigma Aldrich (Milwaukee, Wis.). 5CB was purchased from EMD Chemicals (Gibbstown, N.J.). Titanium (99.999%) and gold (99.999%) were purchased from Advanced Materials (Spring Valley, N.Y.). Methanol and Fischer's Finest glass slides were purchased from Fischer Scientific (Pittsburgh, Pa.). Absolute ethanol (anhydrous, 200 proof) was purchased from Pharmco-AAPER (Brookfield, Conn.). All chemicals and solvents were of analytical reagent grade and were used as received without any further purification.

Methods

Cleaning of Glass Substrates

Glass microscope slides were cleaned according to published procedures using acidic "piranha" solution [70:30 (% v/v) $H_2SO_4$:$H_2O_2$ (30%)]. Briefly, the glass slides were immersed in an acidic piranha bath at 60-80° C. for at least 1 h, and then rinsed in running deionized water for 2-3 min. The slides were then immersed in basic piranha [70:30 (% v/v) KOH: $H_2O_2$] and heated to between 60 and 80° C. for at least 1 h. Finally, the slides were rinsed sequentially in deionized water, ethanol, and methanol, and then dried under a stream of nitrogen. The clean slides were stored in an oven at 110° C. All other glassware was rinsed with distilled water and ethanol and dried under a gaseous stream of nitrogen.

Preparation of Metal-Salt Functionalized Glass Surfaces

Mixtures of the metal salts were formed in an ethanolic solution in which the concentration of the metal cation remained constant. The metal salts were then deposited immediately onto glass slides by spin coating the ethanolic solution of the salt solution at 3000 rpm for 30 s (WS-400A-6NPP/Lite, Laurell Technologies, North Wales, Pa.).

Deposition of Thin Layers of Gold

Semi-transparent films of gold with thicknesses of 200 Å were deposited onto piranha-cleaned glass slides mounted on a fixed holder within an electron beam evaporator (VEC-3000-C manufactured by Tekvac Industries, Brentwood, N.Y.). A layer of titanium (thickness 80 Å) was used to promote adhesion between the glass microscope slides and the films of gold. The rates of deposition of gold and titanium were 0.2 Å/s. The pressure in the evaporator was maintained at less than $3 \times 10^{-6}$ Torr before and during each deposition. The gold source was periodically cleaned by sequential immersion in aqua regia (70% $HNO_3$, 30% HCl) and piranha solutions at 50° C. (30 min in each solution); see above for compositions. The cycle was repeated 3-4 times, rinsing the source between cycles in deionized water.

Formation of Micrometer-Thick Films of LC

After coating the surfaces with either the metal salt or the gold film, as described above, an 18 μm-thick transmission electron microscopy (TEM) grid (Electron Microscopy Sciences, Hatfield, Pa.) was fastened to the coated surface. The TEM grid defined square pores with lateral dimensions of 285 μm. The grid had an overall diameter of 3 mm. The grids were filled with LC using a microcapillary tube at room temperature, taking care to fill only the middle squares of the TEM grid, so as to avoid wicking of the 5CB.

Exposure to $Cl_2$ and Control Analytes

The samples, prepared as described above, were exposed to a stream of nitrogen containing the indicated concentration of $Cl_2$ and water vapor (expressed as relative humidity, RH) or the indicated concentration of control analytes ($NH_3$, dimethyl methylphosphonate, DMMP) within a flow cell that was constructed to direct the flow of air across the LC samples while permitting simultaneous observation of the samples through a polarized light microscope (CH40, Olympus, Melville, N.Y.). The RH of the air was controlled using a portable dew point generator (LI-610, LI-COR Biosciences, Lincoln, Nebr.). The temperature of the gas fed to the flow cell was maintained at room temperature (25° C.).

Example 2

Figure 1B:
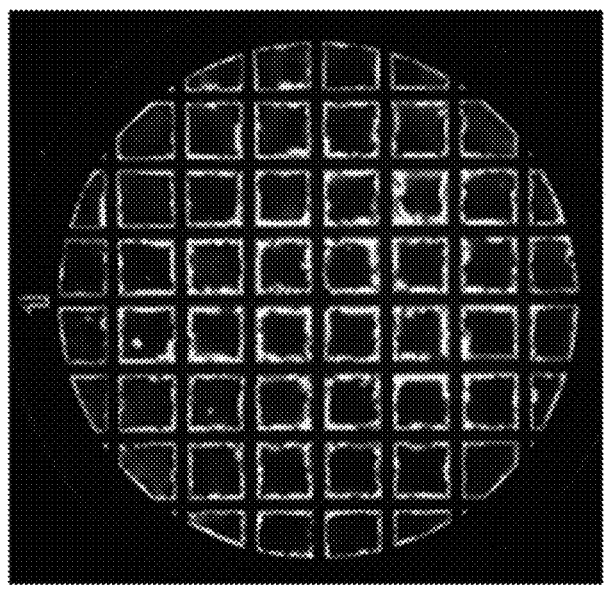
FIG. 1B is a cross-polarized image of 5CB on an Al(ClO$_4$)$_3$-decorated glass surface compartmentalized with a TEM grid. The image within each grid compartment is characteristic of the homeotropic orientational ordering of the 5CB, as illustrated in FIG. 1A.

LC-Based Detection of $Cl_2$ Using a Substrate Surface Functionalized with $Mn^{2+}$ Introduction First, 5CB was shown to anchor on metal perchlorate surfaces. FIG. 1A illustrates the experimental setup that is described in more detail in Example 1 above. As seen in FIG. 1B, 5CB on $Al(ClO_4)_3$-decorated glass exhibits the expected homeotropic orientational ordering relative to the substrate surface.

Our previously-disclosed approach for liquid crystal-based detection methods involving tuning a metal salt surface to optimize adsorption and/or binding of a potential analyte to the metal salt surface does not work for detecting $Cl_2$. Accordingly, we needed to develop a fresh approach that could be used to facilitate a change in LC orientation on contact with $Cl_2$, but not on contact with other agents or with ambient air.

Results

As the basis of our first new approach, we considered the redox reaction of $Cl_2$ with various metal salts. For example, in a reaction that is used to remove $Mn^{2+}$ from ground water, $Cl_2$ oxidizes $Mn^{2+}$ to $MnO_2$ by the following two-step mechanism.

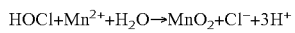

To successfully use a redox approach, the substrate must contain a metal cation that is spontaneously oxidized by $Cl_2$ (i.e., where the net redox reaction is thermodynamically favorable), but that is not spontaneously oxidized by the $O_2$ in ambient air or by another analyte that may be present in a test sample. Furthermore, the redox reaction must result in a chemical change on the substrate surface that substantially reduces the anchoring strength of the LC to the substrate surface, so that a change in orientational ordering may be readily observed.

We tested four metal cations for their suitability for use in such a system: $Al^{3+}$, $Cr^{3+}$, $Ni^{2+}$, and $Mn^{2+}$. Each of these cations exhibits relatively strong binding to nitrile-containing LCs, as illustrated in Table 2 below (listing binding energies of the metal perchlorates to benzonitrile, a nitrile-containing LC surrogate).

TABLE 2

Binding free energies (eV) for four metal
perchlorates to benzonitrile (PhCN)

| Perchlorate | PhCN |
|---|---|
| $Ni^{2+}$ | −1.04 |
| $Mn^{2+}$ | −0.80 |
| $Cr^{3+}$ | −0.43 |
| $Al^{3+}$ | −0.40 |

$Cl_2$ has a standard reduction potential of +1.36 V:

$$Cl_2(g) + 2e^- \rightarrow 2Cl^-(aq) + 1.36V$$

The reduction potential of the oxidation product of $Mn^{2+}$ is less than this, at +1.23 V:

$$MnO_2(s) + 4H^+(aq) + 2e^- \rightarrow Mn^{2+}(aq) + 2H_2O(l) + 1.23 \text{ eV}$$

Accordingly, the net redox reaction where $Mn^{2+}$ is oxidized to $MnO_2$ and $Cl_2$ is reduced to $Cl^-$ is thermodynamically favored (+0.13 V), while an alternative net redox reaction where $Mn^{2+}$ is oxidixed to $MnO_2$ and $O_2$ is reduced is not.

These characteristics mark $Mn^{2+}$ as the most promising of the tested cations. As noted above, $Mn^{2+}$'s redox potential makes it suitable for spontaneously reacting with $Cl_2$, but not with $O_2$. Thus, oxygen in ambient air would not interfere with chlorine detection. In contrast, $Al^{3+}$ is already in its highest oxidation state, and cannot be oxidized further by $Cl_2$. Furthermore, the oxidations of both $Cr^{3+}$ and $Ni^{2+}$ have corresponding reduction potentials that are greater than that of chlorine:

$$NiO_2(s) + 4H^+(aq) + 2e^- \rightarrow Ni^{2+}(aq) + 2H_2O(l) + 1.59V$$

$$HCrO_4^+(aq) + 7H^+(aq) + 3e^- \rightarrow 2Cr^{3+}(aq) + 4H_2O(l) + 1.35V$$

Thus, the corresponding net redox reactions where $Cr^{3+}$ or $Ni^{2+}$ is oxidized by $Cl_2$ would be thermodynamically unfavorable.

Figure 2:
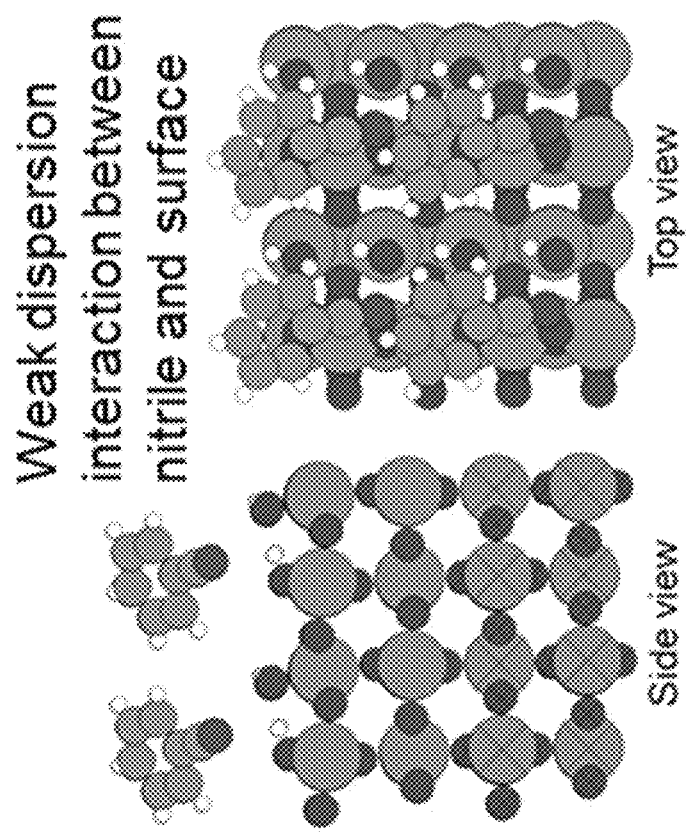
FIG. 2 illustrates the atomic level structure of benzontrile (PhCN) on a MnO$_2$ surface. In the left panel side view, the hydrogen bond between the nitrile and surface—OH is shown as a dashed line. The right panel shows the top view. Carbon atoms are grey, hydrogen atoms are white, nitrogen atoms are blue, manganese atoms are purple, and oxygen atoms are red.

Next, we performed quantum chemical calculations to determine if the $MnO_2$ produced by the oxidation of $Mn^{2+}$ could facilitate a substantial change of the liquid crystal anchoring to a substrate surface. We modeled the interaction of benzonitrile (PhCN), a nitrile-containing LC surrogate, with a hydroxylated $MnO_2$ surface. As illustrated in FIG. 2, the PhCN can bind only to the —OH moieties on the top of the $MnO_2$ surface. The calculated binding energy is −0.40 eV. Considered together with a Free Energy correction of ~0.5 eV, the predicted binding strength is quite weak, with no homeotropic ordering expected for a liquid crystal in contact with such a surface. Accordingly, our model predicts that after the $Mn^{2+}$ ions on a substrate surface are oxidized to $MnO_2$, the LC in contact with the substrate surface cannot bind to the surface, and should undergo an orientation transition from homeotropic to planar. Notably, our model also predicts that $H_2O$ is required for the $Mn^{2+}$ oxidation reaction and resulting $Cl_2$ detection.

To confirm our predictions, we monitored the response of four different cation-containing substrate-LC combinations upon exposure to 1 ppm $Cl_2$ at 35% relative humidity (RH) and to $N_2$ without $Cl_2$ at 35% relative humidity. The four different substrates used were 10.8±0.3 pmol/mm² $Mn(ClO_4)_2$, 11.1±0.7 pmol/mm² $Al(ClO_4)_3$, 10.5±0.5 pmol/mm² $Cr(ClO_4)_3$, and 10.6±0.6 pmol/mm² $Ni(ClO_4)_2$, each disposed on a glass surface. The optical response was monitored through 30 minutes of exposure.

Figure 3A:
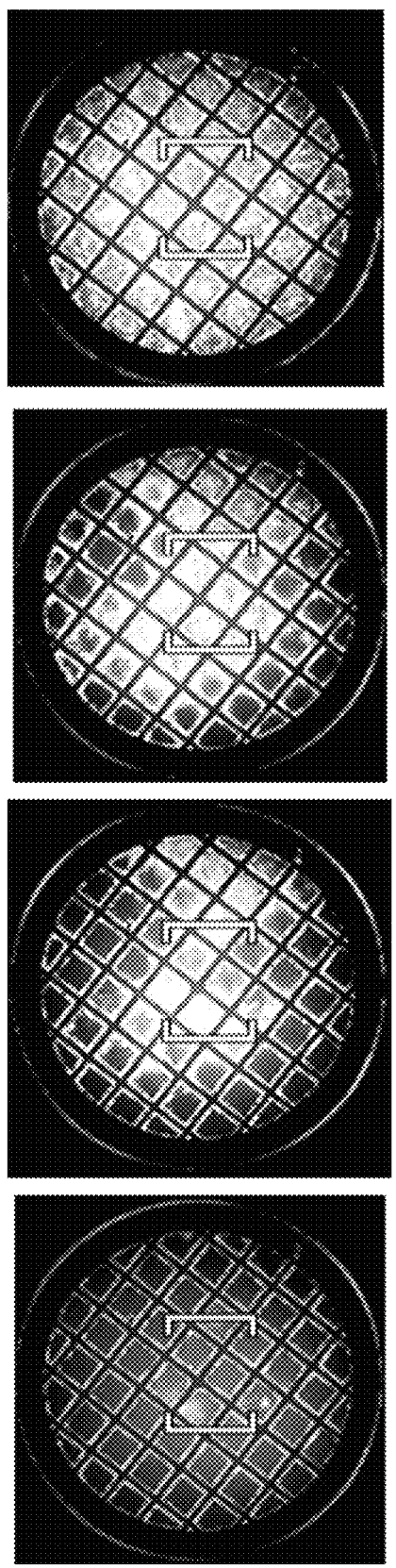
FIG. 3A is a series of cross-polarized images of 5CB on a glass surface decorated with Mn(ClO$_4$)$_2$ (10.8±0.3 pmol/mm$^2$) and compartmentalized with a TEM grid, 0 minutes (leftmost panel), 10 minutes (second left panel), 15 minutes (second right panel) and 30 minutes (rightmost panel) after exposure to 1 ppm Cl$_2$ at ~35% relative humidity. The image series shows the complete shift in the 5CB orientational ordering from homeotropic to fully planar relative to the substrate surface over the 30 minute time period.
Figure 3B:
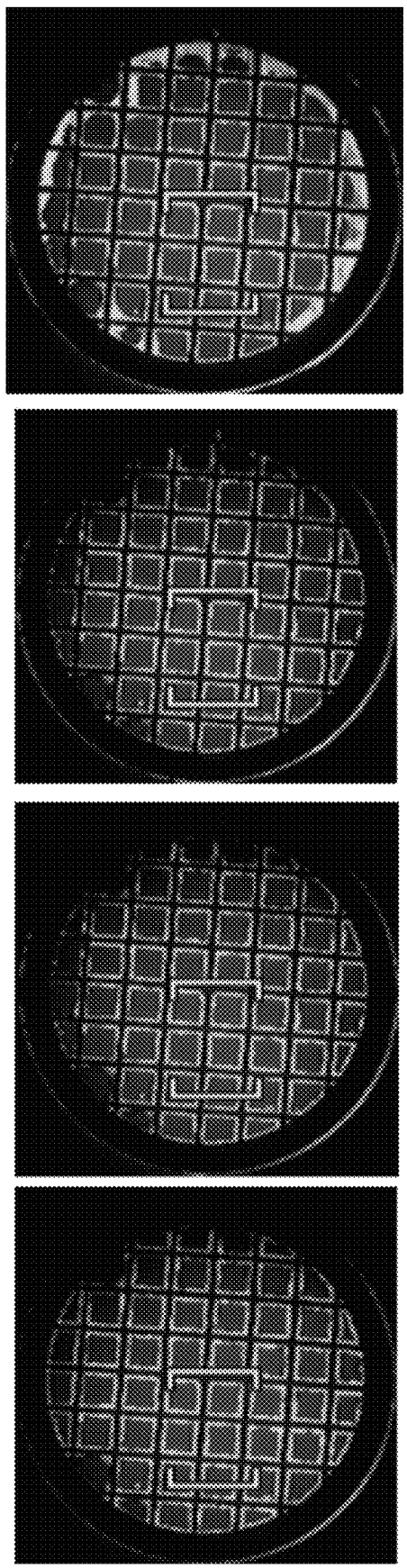
FIG. 3B is a series of cross-polarized images of 5CB on a glass surface decorated with Al(ClO$_4$)$_3$ (11.1±0.7 pmol/mm$^2$) and compartmentalized with a TEM grid, 0 minutes (leftmost panel), 10 minutes (second left panel), 15 minutes (second right panel) and 30 minutes (rightmost panel) after exposure to 1 ppm Cl$_2$ at ~35% relative humidity. The image series shows no shift in the 5CB orientational ordering over the 30 minute time period, with the 5CB maintaining a homeotropic orientation.
Figure 3C:
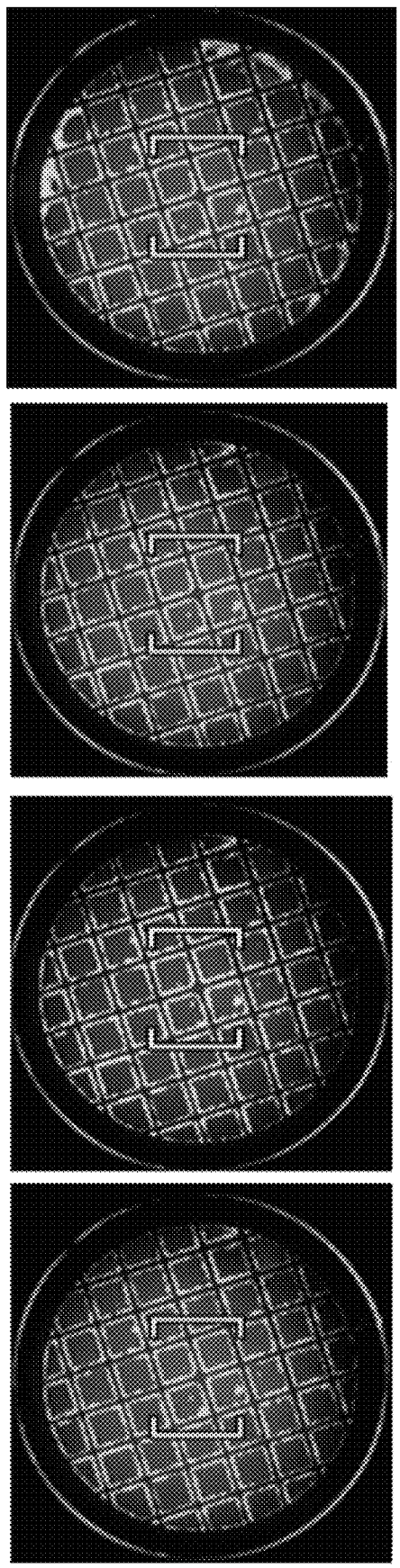
FIG. 3C is a series of cross-polarized images of 5CB on a glass surface decorated with Cr(ClO$_4$)$_3$ (10.5±0.5 pmol/mm$^2$) and compartmentalized with a TEM grid, 0 minutes (leftmost panel), 10 minutes (second left panel), 15 minutes (second right panel) and 30 minutes (rightmost panel) after exposure to 1 ppm Cl$_2$ at ~35% relative humidity. The image series shows no shift in the 5CB orientational ordering over the 30 minute time period, with the 5CB maintaining a homeotropic orientation.
Figure 3D:
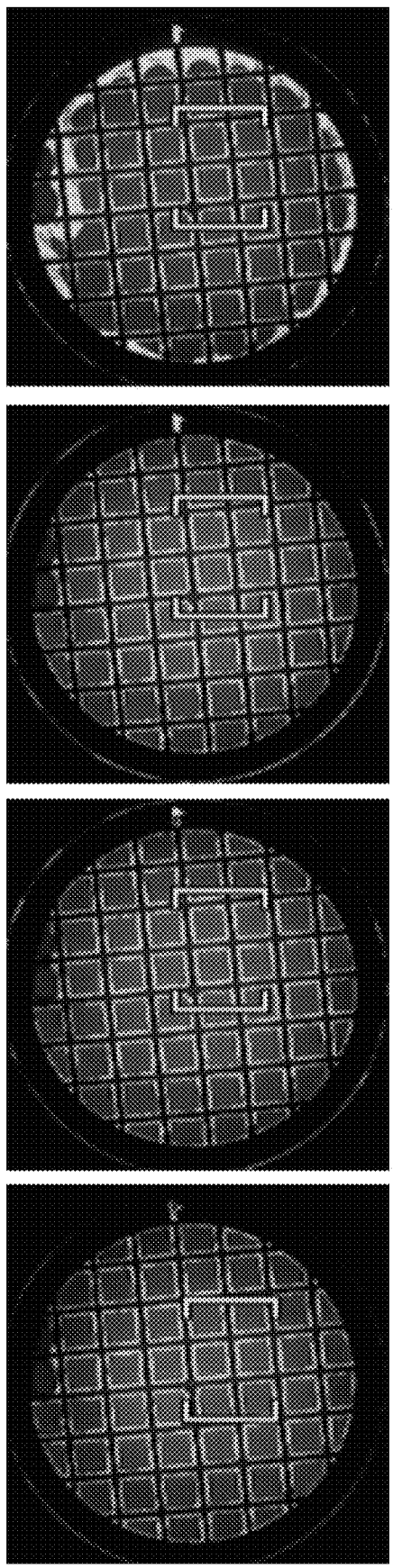
FIG. 3D is a series of cross-polarized images of 5CB on a glass surface decorated with Ni(ClO$_4$)$_2$ (10.6±0.6 pmol/mm$^2$) and compartmentalized with a TEM grid, 0 minutes (leftmost panel), 10 minutes (second left panel), 15 minutes (second right panel) and 30 minutes (rightmost panel) after exposure to 1 ppm Cl$_2$ at ~35% relative humidity. The image series shows no shift in the 5CB orientational ordering over the 30 minute time period, with the 5CB maintaining a homeotropic orientation.

As seen in FIG. 3A, exposure of the $Mn^{2+}$-containing substrate ($Mn(ClO_4)_2$) to the $Cl_2$-containing gas sample resulted in an observable change in LC orientation within 30 minutes, from homeotropic to fully planar. No response was seen with the other three metal cation perchlorates (see FIGS. 3B, 3C and 3D). Furthermore, no response was seen for any of the perchlorate salts exposed to the Chlorine-free nitrogen (data not shown).

Next, we determined whether the results held if the substrate surfaces were exposed to the $Cl_2$ first, before the LC was contacted with the substrate surfaces. Again, the four different substrates used were 10.8±0.3 pmol/mm² $Mn(ClO_4)_2$, 11.1±0.7 pmol/mm² $Al(ClO_4)_3$, 10.5±0.5 pmol/mm² $Cr(ClO_4)_3$, and 10.6±0.6 pmol/mm² $Ni(ClO_4)_2$, each disposed on a glass surface. The surfaces were each exposed to 5 ppm $Cl_2$ with about 35% RH for 1 hour, then observed under crossed-polarizers after purging for 15 minutes with dry $N_2$.

Figure 4A:
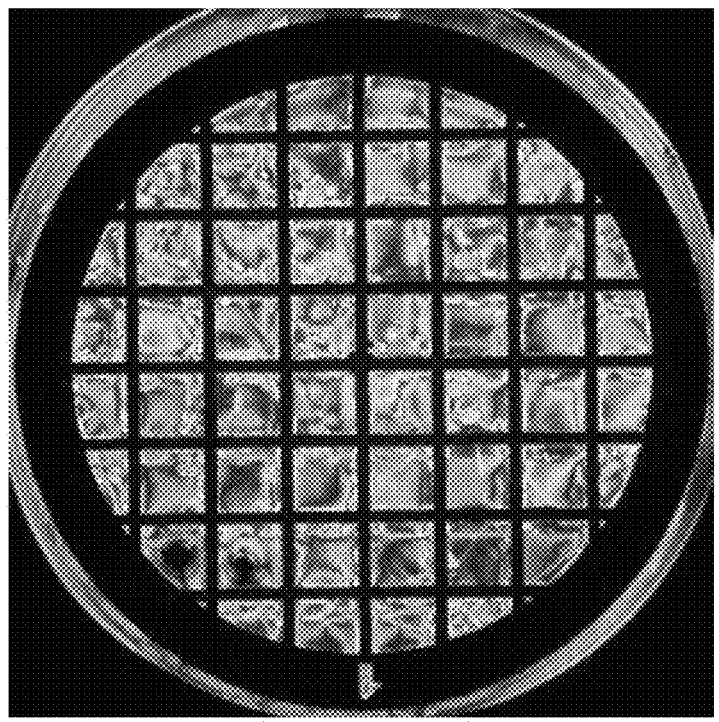
FIG. 4A is cross-polarized image of 5CB on a glass surface decorated with Mn(ClO$_4$)$_2$ (10.8±0.3 pmol/mm$^2$) and compartmentalized with a TEM grid, after exposing the substrate surface with 5 ppm Cl$_2$ at ~35% relative humidity for 1 hour before adding the 5CB. The image illustrates that after the substrate surface is exposed to the chlorine, the 5CB exhibits planar orientational ordering relative to the substrate surface.
Figure 4B:
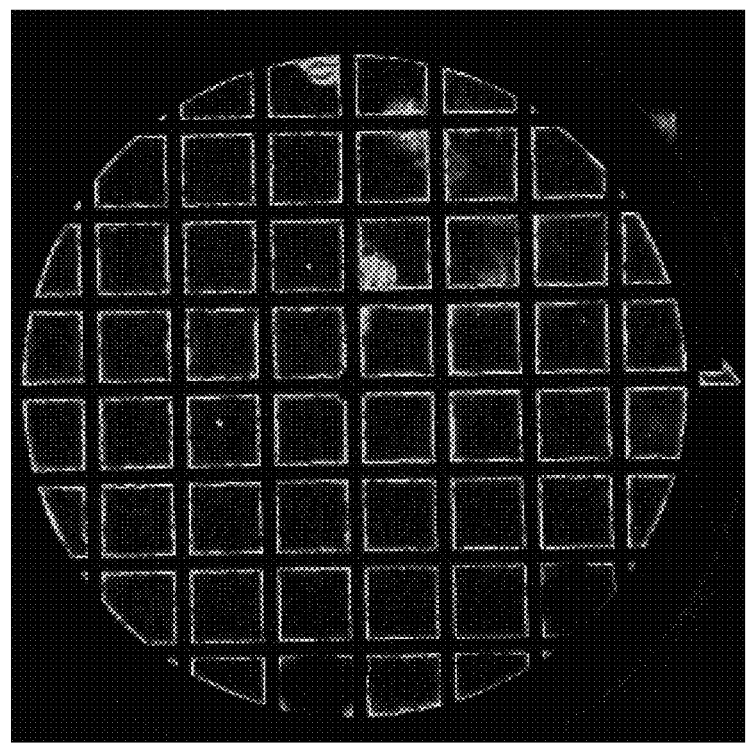
FIG. 4B is cross-polarized image of 5CB on a glass surface decorated with Al(ClO$_4$)$_3$ (11.1±0.7 pmol/mm$^2$) and compartmentalized with a TEM grid, after exposing the substrate surface with 5 ppm Cl$_2$ at ~35% relative humidity for 1 hour before adding the 5CB. The image illustrates that after the substrate surface is exposed to the chlorine, the 5CB maintains its homeotropic orientational ordering relative to the substrate surface.
Figure 4C:
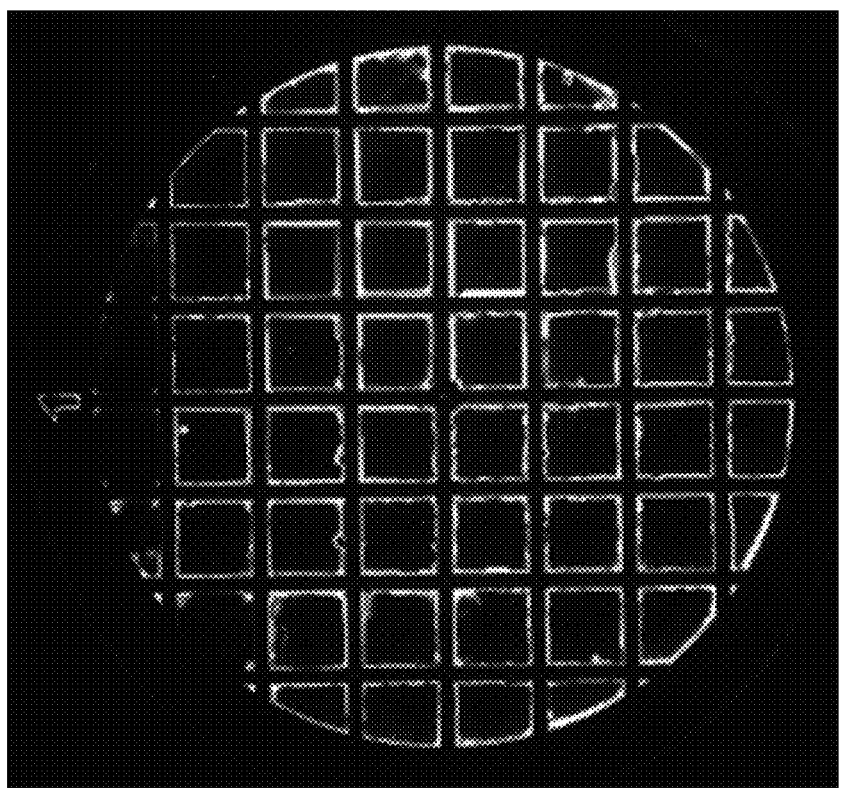
FIG. 4C is cross-polarized image of 5CB on a glass surface decorated with Cr(ClO$_4$)$_3$ (10.5±0.5 pmol/mm$^2$) and compartmentalized with a TEM grid, after exposing the substrate surface with 5 ppm Cl$_2$ at ~35% relative humidity for 1 hour before adding the 5CB. The image illustrates that after the substrate surface is exposed to the chlorine, the 5CB maintains its homeotropic orientational ordering relative to the substrate surface.
Figure 4D:
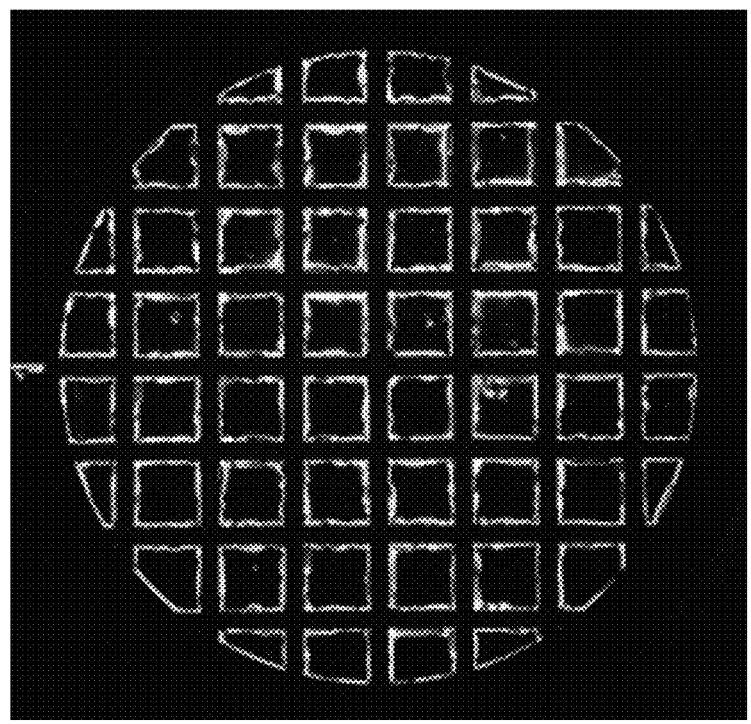
FIG. 4D is cross-polarized image of 5CB on a glass surface decorated with Ni(ClO$_4$)$_2$ (10.6±0.6 pmol/mm$^2$) and compartmentalized with a TEM grid, after exposing the substrate surface with 5 ppm Cl$_2$ at ~35% relative humidity for 1 hour before adding the 5CB. The image illustrates that after the substrate surface is exposed to the chlorine, the 5CB maintains its homeotropic orientational ordering relative to the substrate surface.

As seen in FIG. 4A, the same LC orientation transition from homeotropic to planar is observed with the $Mn^{2+}$-containing substrate surface. The other three substrates exhibited no response (See FIGS. 4B, 4C, and 4D). These results demonstrate that the $Mn^{2+}$-containing substrate can effectively detect $Cl_2$, regardless of whether the LC is added to the substrate before or after exposure to the putatively chlorine-containing gas sample. Furthermore, although both chlorine and water are necessary to get a positive response, the order in which these two components are added does not affect the ultimate result.

Discussion

The cross-verification experiments confirmed that both chlorine and water are needed to obtain a response, but that the order that the water and chlorine are added (chlorine, then water, or water, then chlorine) does not affect the final response.

Notably, the detection reaction does not appear to be reversible. This provides another advantage for using the disclosed device, in that a remotely placed or wearable detector would maintain its signal of chlorine contact for an extended period after contact occurs. Thus, a false negative signal would not occur when a wearable detector is removed or a remotely placed device is retrieved long after chlorine exposure occurs.

Figure 5A:
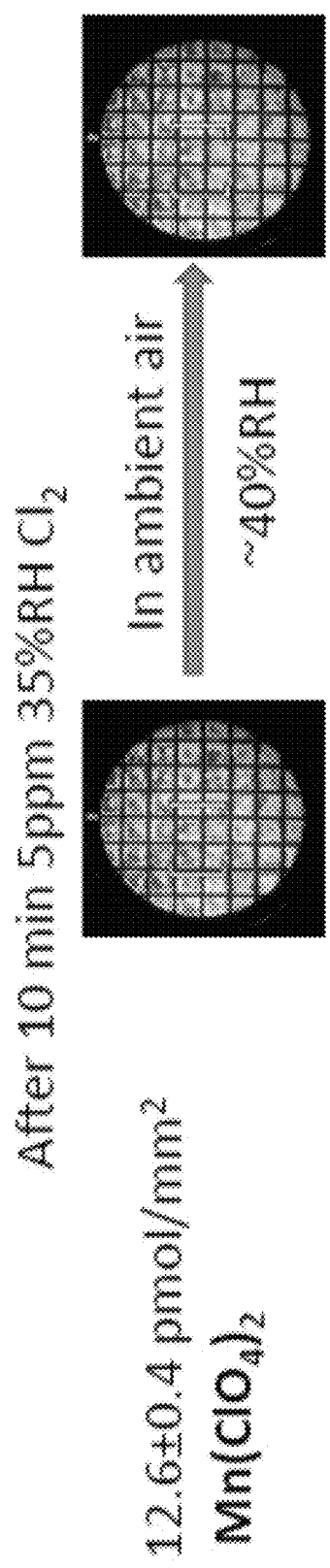
FIG. 5A includes cross-polarized images of 5CB on a glass surface decorated with Mn(ClO$_4$)$_2$ (10.8±0.3 pmol/mm$^2$) and compartmentalized with a TEM grid, after exposing the substrate surface with 5 ppm Cl$_2$ at ~35% relative humidity for 10 minutes (left panel), and subsequently exposing the 5CB to ambient air at ~40% relative humidity (right panel). The 5CB maintains its planar orientational ordering relative to the substrate surface.
Figure 5B:
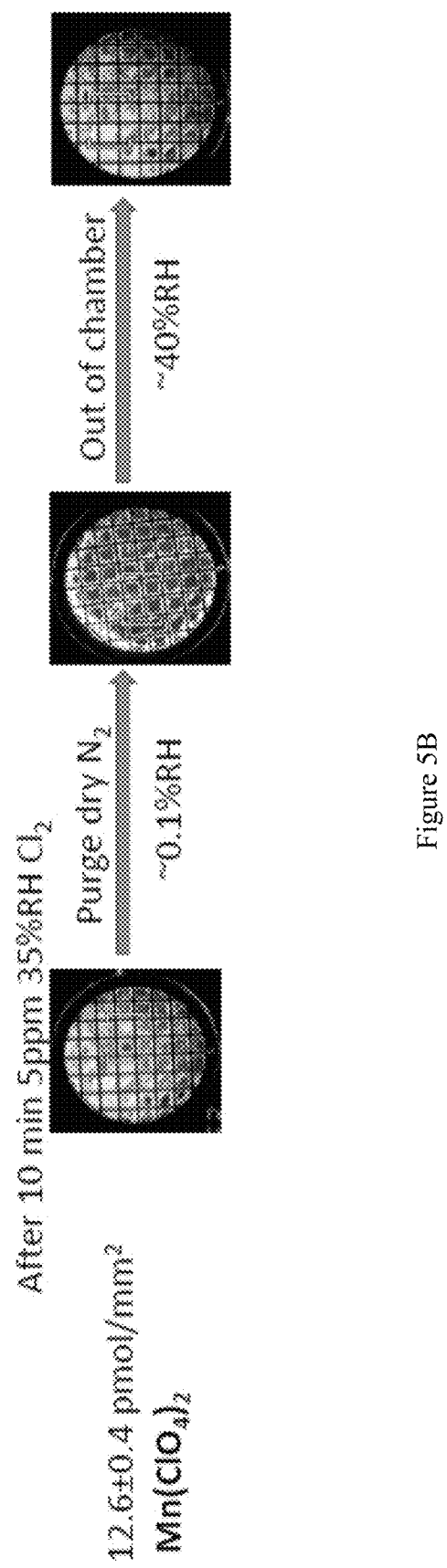
FIG. 5B includes cross-polarized images of 5CB on a glass surface decorated with Mn(ClO$_4$)$_2$ (10.8±0.3 pmol/mm$^2$) and compartmentalized with a TEM grid, after exposing the substrate surface with 5 ppm Cl$_2$ at ~35% relative humidity for 10 minutes (left panel), subsequently purging the 5CB with dry N$_2$ at ~0.1% relative humidity (center panel), and then exposing the 5CB to ambient air outside of the environmentally controlled chamber (~40% relative humidity). The 5CB retains its planar orientational ordering relative to the substrate surface in the ambient humid air (rightmost panel), but not in the dry N$_2$ (center panel).

To confirm this lack of reversibility, we exposed a 10.8±0.3 pmol/mm² $Mn(ClO_4)_2$ substrate surface on glass overlaid with 5CB to 5 ppm $Cl_2$ at 35% RH for ten minutes. One sample was then exposed to ambient air at about 40% RH, and a separate sample was purged with dry $N_2$ (about 0.1% RH), and then removed from the chamber and exposed to about 40% RH ambient air. As seen in FIGS. 5A and 5B, removal of the initial reactants does not change the final optical state of the LC.

Conclusion. We have demonstrated that liquid crystal disposed on a substrate surface comprising a relatively low density of $Mn^{2+}$ cations can be used to detect 1 ppm $Cl_2$ gas in a gas mixture that also contains water (the water could also come from other sources). The $Cl_2$ oxidizes the $Mn^{2+}$ on the surface to $MnO_2$, resulting in a substantial change in the binding strength of the substrate surface for the LC, and thus inducing an observable change in the orientational ordering of the LC relative to the substrate surface.

Example 3: LC-Based Detection of $Cl_2$ Using a Gold Metal Substrate Surface

As the second new approach, we considered the feasibility of using gold metal as a surface substrate in liquid crystal-based systems and methods for detecting $Cl_2$.

Figure 6A:
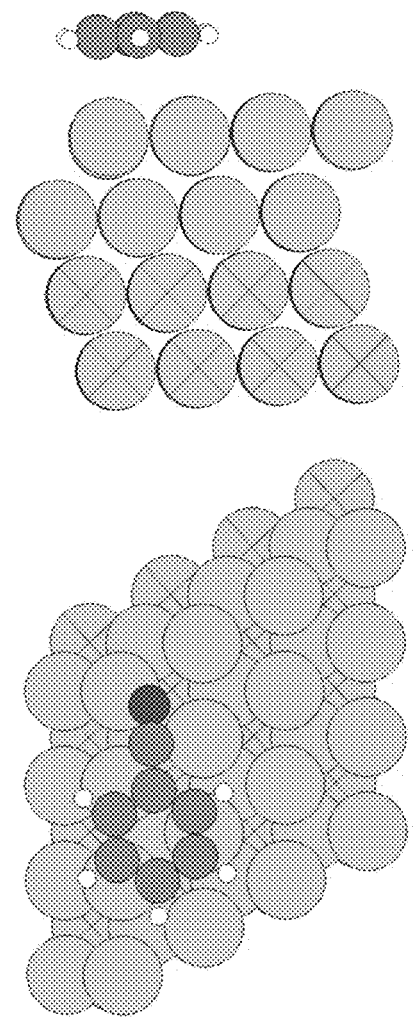
FIG. 6A illustrates a simulated atomic level structure showing the favored anchoring of 5CB on a metallic gold surface, with PhCN being used as a 5CB surrogate. The top panel is a side view, and the bottom panel is a top view. Carbon atoms are grey, hydrogen atoms are white, nitrogen atoms are blue, and gold atoms are yellow.

First, we performed simulations to determine the favored anchoring/orientation configuration of 5CB, the liquid crystal used in Example 2, on a gold metal (111) surface. As illustrated in FIG. 6A, our simulation determined that 5CB (more precisely, its surrogate PhCN) should have a planar orientation when disposed onto a gold metal surface. Accordingly, 5CB cannot be used alone in a liquid crystal composition for chlorine detection using a gold metal substrate surface and a homeotropic to planar orientational ordering transition.

Figure 6B:
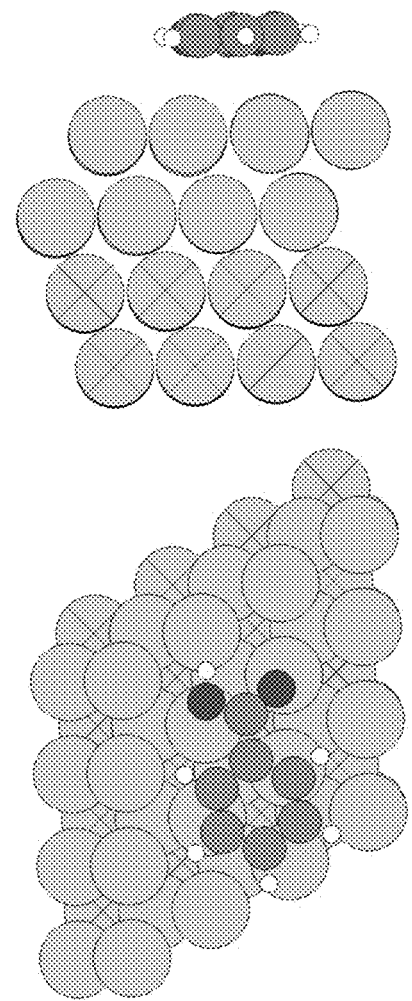
FIG. 6B illustrates a simulated atomic level structure showing the favored anchoring of 4'-cyano-4-biphenylcarboxylic acid (CBCA) on a metallic gold surface. The top panel is a side view, and the bottom panel is a top view. Carbon atoms are grey, hydrogen atoms are white, oxygen atoms are red, and gold atoms are yellow.
Figure 6C:
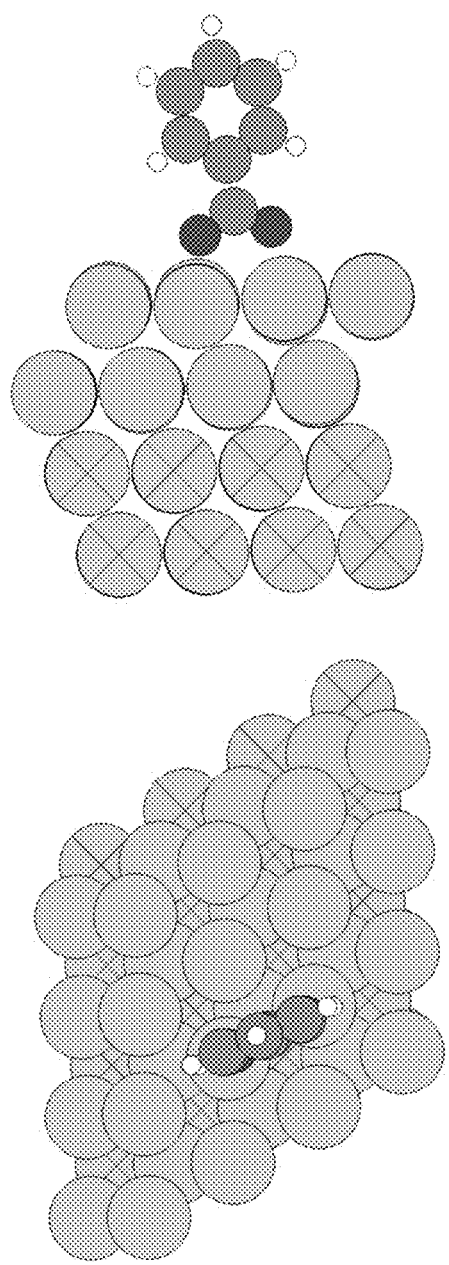
FIG. 6C illustrates a simulated atomic level structure showing the favored anchoring of 4'-cyano-4-biphenylcarboxylate (CBC) on a metallic gold surface. The top panel is a side view, and the bottom panel is a top view. Carbons atoms are grey, hydrogen atoms are white, oxygen atoms are red, and gold atoms are yellow.

We performed further quantum chemical calculations to determine the favored anchoring/orientation of two 5CB analogs, one having a carboxylic acid moiety substituted for the n-pentyl group of 5CB (4-cyano-4-biphenylcarboxylic acid, CBCA), and the carboxylate form of CBCA (CBC), on a gold metal (111) surface. As illustrated in FIG. 6B, our simulation predicted that, like 5CB, CBCA alone should have planar ordering. However, because CBCA is a carboxylic acid, it will always include some of the carboxylate form (CBC). Our simulation predicted that unlike 5CB or CBCA, CBC can exhibit homeotropic anchoring/orientational ordering on a gold metal surface (see FIG. 6C). This result suggests that a liquid crystal composition that contains a sensitizer molecule having a terminal carboxylic acid moiety, such as CBCA, may exhibit homeotropic orientational ordering on a gold metal surface. Furthermore, if $Cl_2$ could significantly reduce the anchoring strength of such a doped composition to the gold metal surface, the doped composition could be used for chlorine detection using a gold metal substrate surface and a homeotropic to planar orientational ordering transition.

Figure 7A:
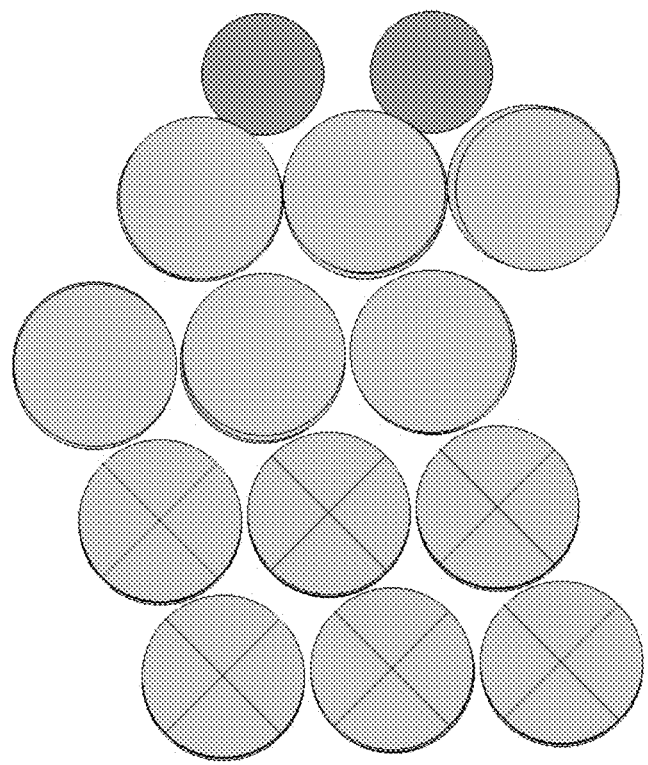
FIG. 7A is a side view illustration of a simulated atomic level structure showing the interaction of $Cl_2$ (chlorine atoms are green) with Au (gold atoms are yellow). The $Cl_2$ dissociatively adsorbs onto the gold surface.
Figure 7B:
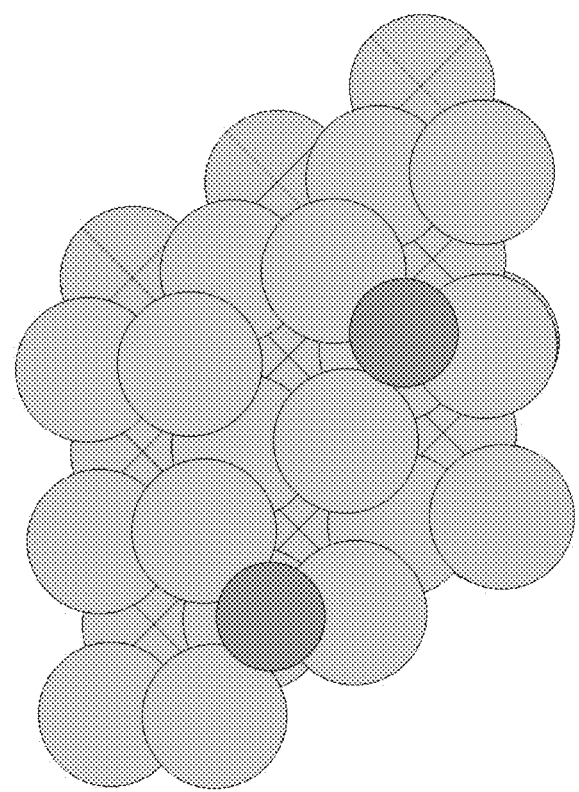
FIG. 7B is a top view illustration of a simulated atomic level structure showing the interaction of $Cl_2$ (chlorine atoms are green) with Au (gold atoms are yellow). The $Cl_2$ dissociatively adsorbs onto the gold surface.
Figure 8A:
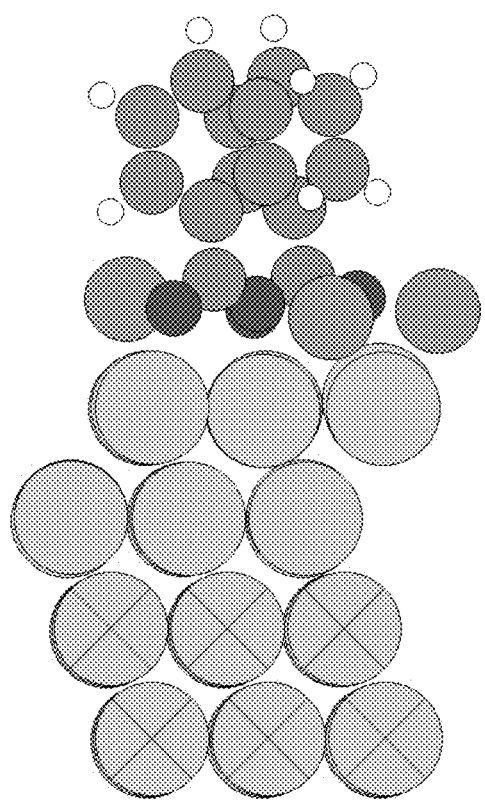
FIG. 8A is a side view illustration of a simulated atomic level structure showing the interaction of CBCA (hydrogen atoms are white, carbon atoms are grey, oxygen atoms are red) with Au (gold atoms are yellow) in the presence of $Cl_2$ (chlorine atoms are green).
Figure 8B:
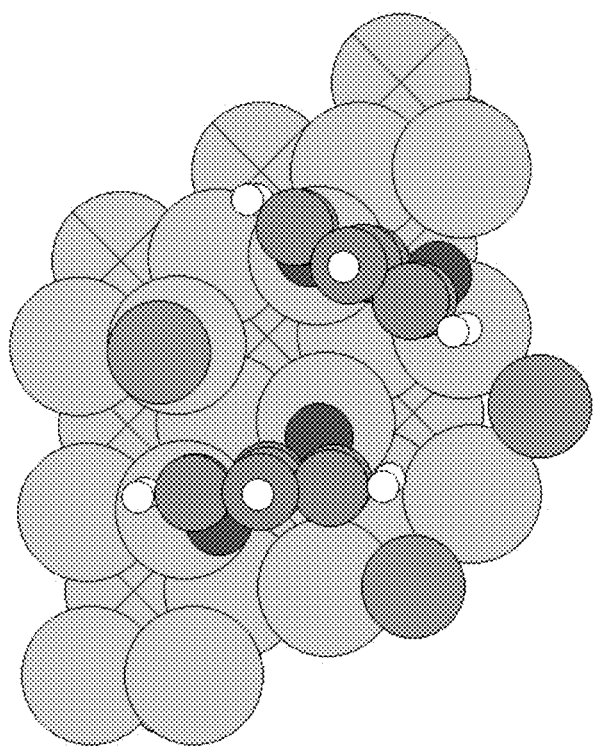
FIG. 8B is a top view illustration of a simulated atomic level structure showing the interaction of CBCA (hydrogen atoms are white, carbon atoms are grey, oxygen atoms are red) with Au (gold atoms are yellow) in the presence of $Cl_2$ (chlorine atoms are green).

We performed further simulations to model the interaction of $Cl_2$ with a gold metal (111) surface. We determined that $Cl_2$ dissociatively adsorbs onto the gold surface, without activation energy barrier (see FIGS. 7A and 7B). We then performed additional simulations to model the interaction of CBCA with a gold metal (111) surface in the presence of dissociatively adsorbed $Cl_2$. As illustrated in FIGS. 8A and 8B, the dissociatively adsorbed $Cl_2$ can trigger the anchoring transition of the CBCA to planar orientational ordering, because the carboxylate group of the CBCA binds more weakly to the gold surface in the presence of Cl atoms. This weaker binding is the direct result of the Cl atoms occupying some of the available active gold binding sites. In sum, our simulations suggested that chlorine adsorption to a gold metal surface can induce a homeotropic to planar orientation transition in CBCA, and this in a liquid crystal composition that is doped with CBCA.

Figure 9A:
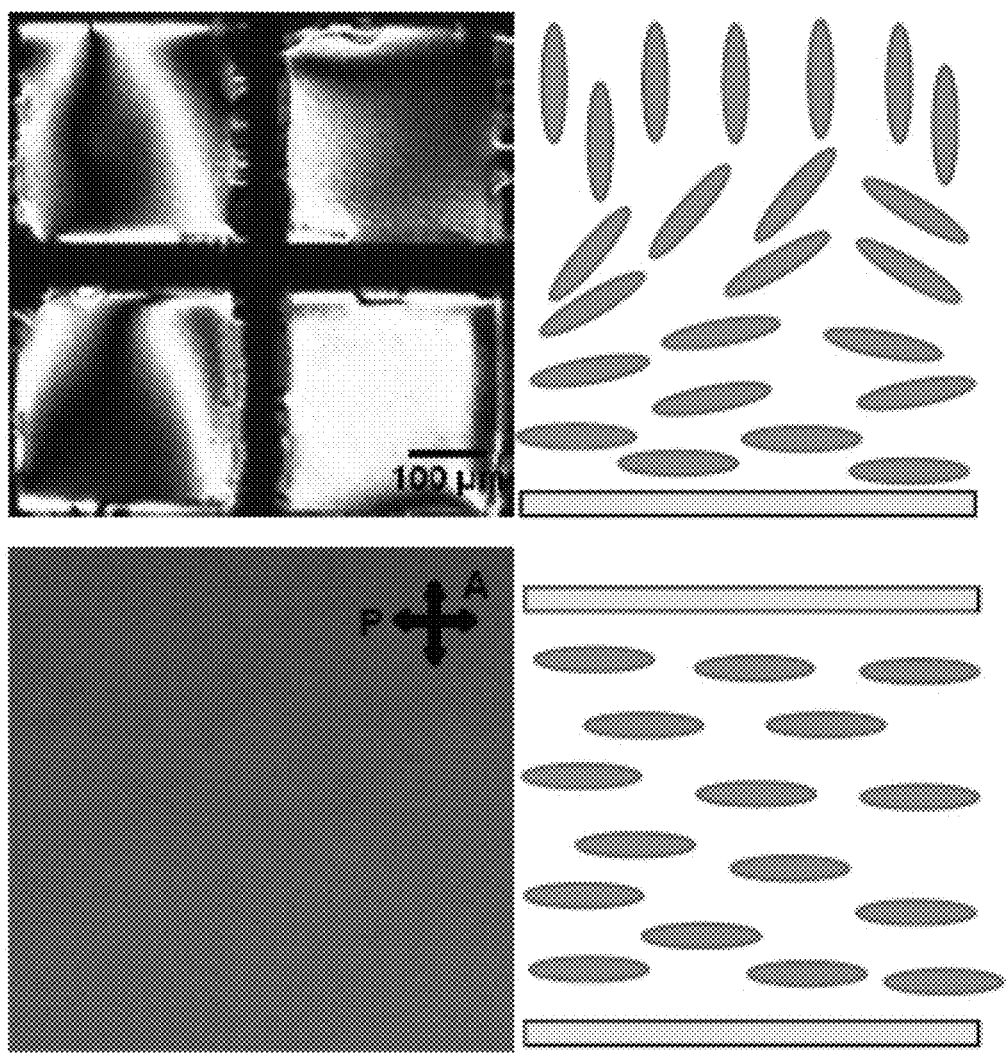
FIG. 9A includes optical micrographs (cross polars) of 5CB disposed on a gold metal surface and constrained by a TEM grid (left panels), along with the corresponding cartoons showing the schematic orientation of the 5CB liquid crystal thin films (right panels). The 5CB assumes a planar orientational ordering relative to the substrate surface.
Figure 9B:
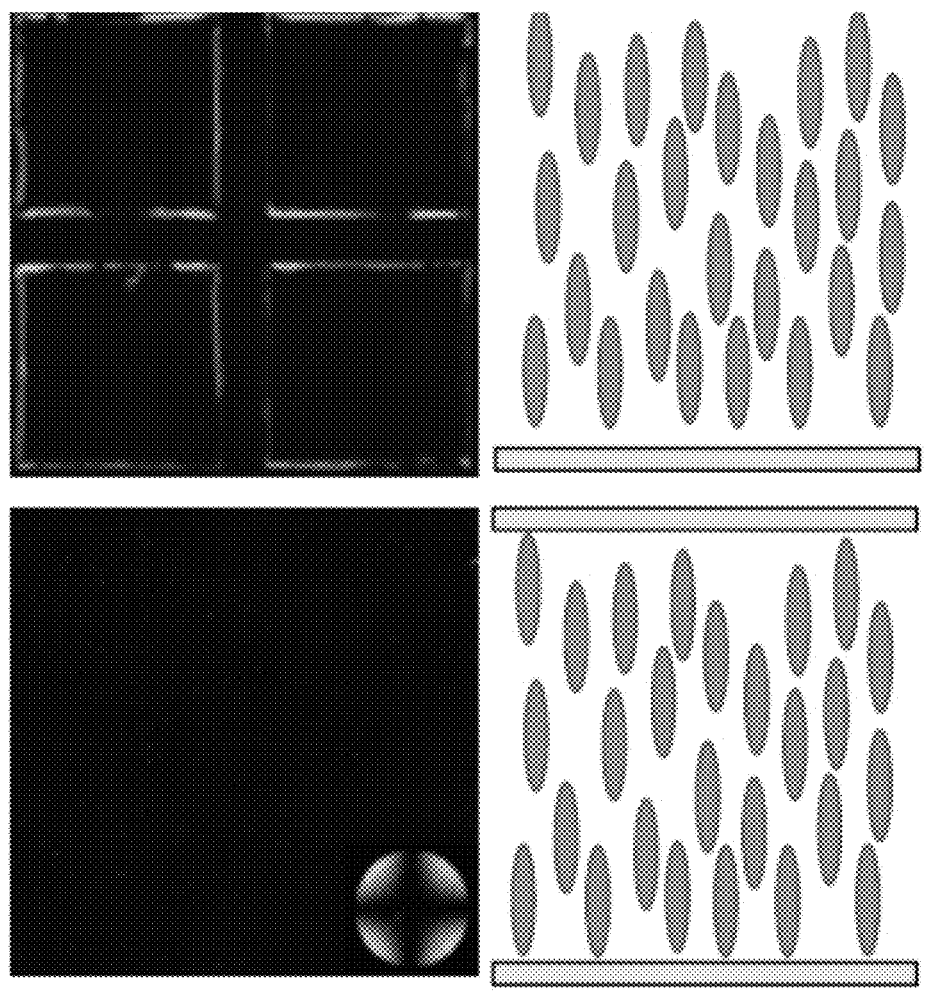
FIG. 9B includes optical micrographs (cross polars) of 5CB doped with 0.005 wt % CBCA disposed on a gold metal surface and constrained by a TEM grid (left panels), along with the corresponding cartoons showing the schematic orientation of the 5CB+CBCA liquid crystal thin films (right panels). In contrast to 5CB alone, the 5CB doped with CBCA maintains a homeotropic orientational ordering relative to the substrate surface.
Figure 9C:
FIG. 9C includes optical micrographs (cross polars) of 5CB doped with 0.005 wt % CBCA disposed on a glass surface and constrained by a TEM grid. In contrast to the 5CB+CBCA on the gold substrate, the 5CB+CBCA on the glass substrate assumes a planar orientational ordering relative to the substrate surface.
Figure 9C:
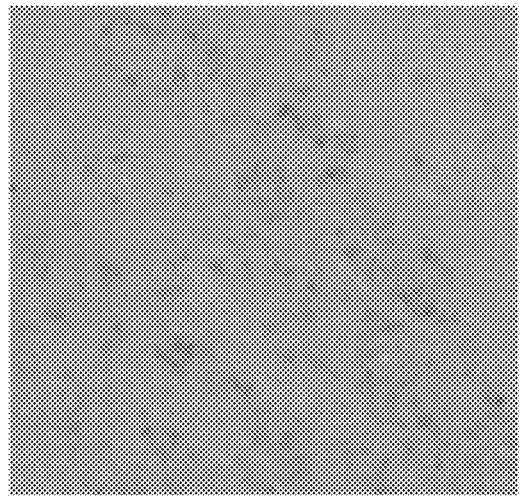

To verify these predictions, we first disposed 5CB alone and a 5CB liquid crystal composition doped with 0.005 wt % CBCA onto a gold metal surface, and optically observed the LC orientation. As seen in FIG. 9A, the 5CB on the gold metal surface ultimately exhibits planar orientation relative to the substrate surface, as predicted by our model. In contrast (and as also predicted by our model), the doped composition exhibits homeotropic orientation relative to the substrate surface (see FIG. 9B). We next disposed the doped composition onto a glass surface, and observed that the composition exhibited planar orientational ordering relative to the substrate surface (see FIG. 9C), confirming the importance of the gold surface in establishing the homeotropic ordering of the doped composition.

Figure 10A:
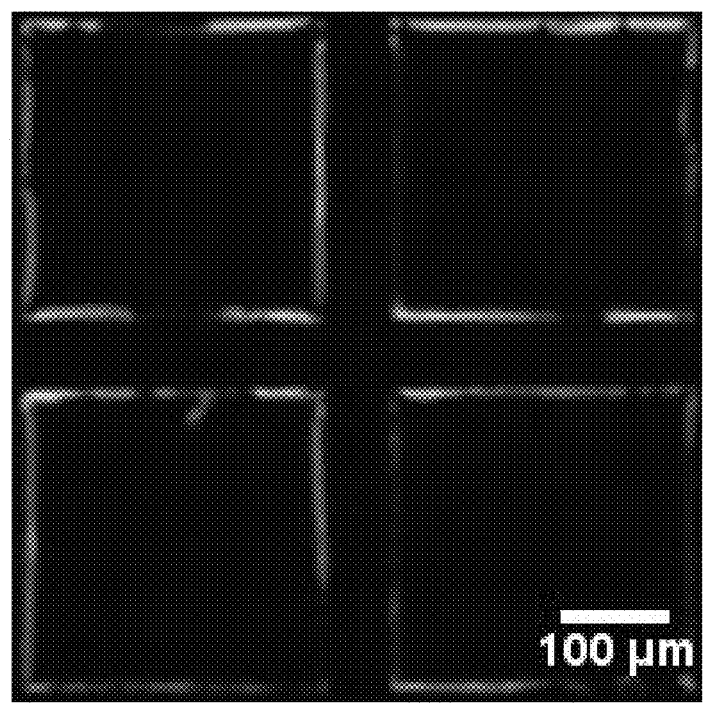
FIG. 10A is an optical micrograph (cross polars) of 5CB doped with 0.005 wt % CBCA disposed on a gold surface and constrained by a TEM grid, after 0 minutes of exposure to 1 ppm $Cl_2$. The micrograph illustrates the initial homeotropic ordering of the 5CB mixture relative to the substrate surface.
Figure 10B:
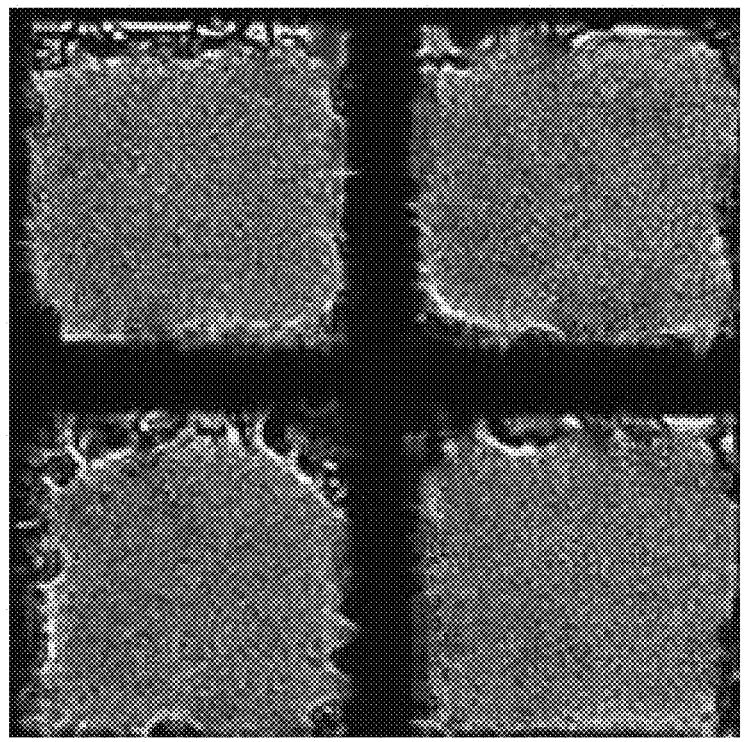
FIG. 10B is an optical micrograph (cross polars) of 5CB doped with 0.005 wt % CBCA disposed on a gold surface and constrained by a TEM grid, after 30 minutes of exposure to 1 ppm $Cl_2$. The micrograph illustrates the $Cl_2$-facilitated shift in the orientational ordering of the 5CB mixture from homeotropic to planar relative to the substrate surface.
Figure 10C:
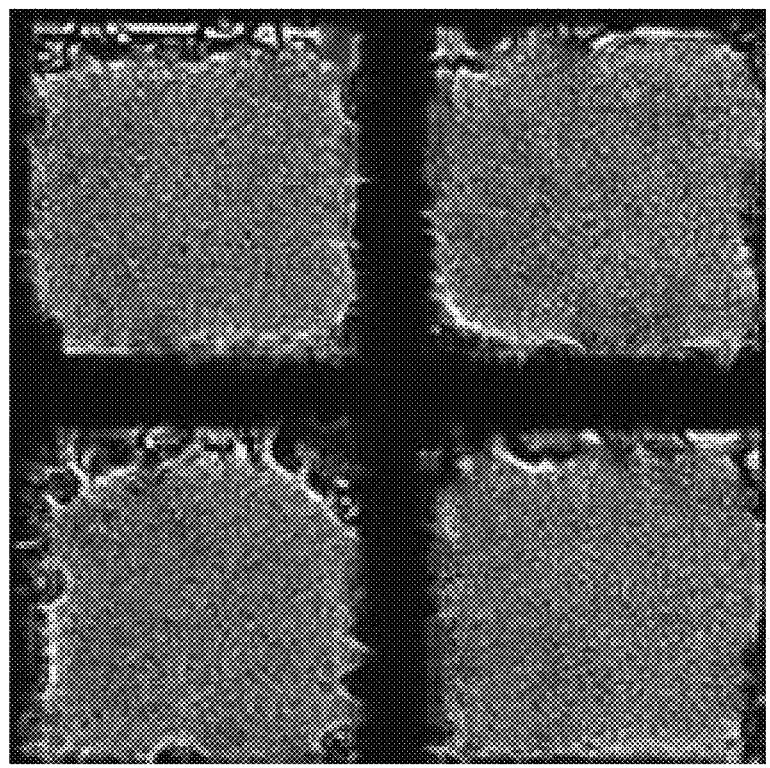
FIG. 10C is an optical micrograph (cross polars) of 5CB doped with 0.005 wt % CBCA disposed on a gold surface and constrained by a TEM grid, after 30 minutes of exposure to 1 ppm $Cl_2$, followed by exposure to a pure $N_2$ gas stream. The micrograph illustrates that the $Cl_2$-facilitated shift in the orientational ordering of the 5CB mixture from homeotropic to planar relative to the substrate surface is maintained after the $Cl_2$ exposure has ended.

Next, we experimentally confirmed that a gold surface in conjunction with a doped liquid crystal composition can be used to successfully detect $Cl_2$. The doped composition (0.005 wt % CBCA in 5CB) was disposed as a thin film onto a gold metal surface. The composition was then exposed to 1 ppm $Cl_2$ for 30 minutes. Then, the gas stream was replaced by pure $N_2$. As seen in FIG. 10A, the orientation of the doped composition was initially homeotropic. However, after 30 minutes of exposure to $Cl_2$, the orientation of the composition had transitioned to planar (see FIG. 10B). As verified in FIG. 10C, after the orientation change, the process is irreversible. This data provides proof of principle for using a gold surface and doped liquid crystal composition to successfully detect chlorine gas.

Figure 11A:
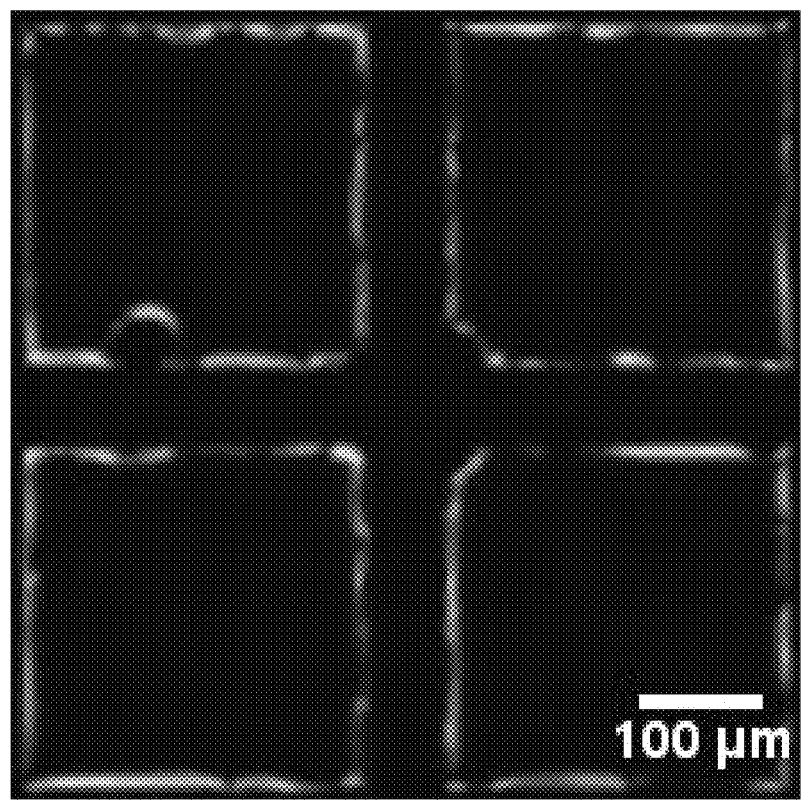
FIG. 11A is an optical micrograph (cross polars) of 5CB doped with 0.005 wt % CBCA disposed on a gold surface and constrained by a TEM grid, after 0 minutes of exposure to 80% relative humidity $N_2$, 1 ppm $NH_3$, 1 ppm dimethyl methylphosphonate (DMMP), and 1 ppm ethylene oxide. The micrograph illustrates the initial homeotropic ordering of the 5CB mixture relative to the substrate surface.
Figure 11B:
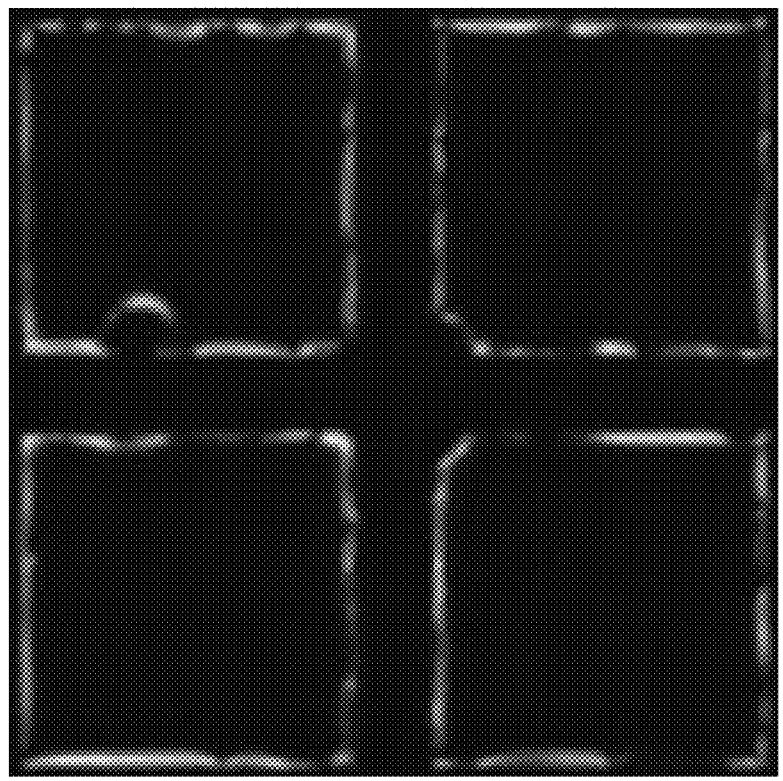
FIG. 11B is an optical micrograph (cross polars) of 5CB doped with 0.005 wt % CBCA disposed on a gold surface and constrained by a TEM grid, after 60 minutes of exposure to 80% relative humidity $N_2$, 1 ppm $NH_3$, 1 ppm dimethyl methylphosphonate (DMMP), and 1 ppm ethylene oxide. The micrograph illustrates that, in contrast to $Cl_2$, none of the tested agents ($H_2O$, $NH_3$, DMMP or EtO) bind to the gold surface. Accordingly, the initial homeotropic ordering of the 5CB mixture relative to the substrate surface is maintained.

Finally, we demonstrated the selectivity of the disclosed detector to chlorine gas. We again disposed the doped composition (0.005 wt % CBCA in 5CB) onto a gold metal surfaces, and exposed the resulting detector to 80% RH $N_2$ including 1 ppm $NH_3$, 1 ppm dimethyl methylphosphonate (DMMP), 1 ppm ethylene oxide (EtOH) for 60 minutes. As seen in FIGS. 11A and 11B, no change in orientational ordering was observed. These results are consistent with our simulations, which show no binding of $H_2O$, $NH_3$, DMMP or EtO to a gold surface.

Conclusion

In sum, the Example provides experimental verification that a gold surface in combination with a doped liquid crystal composition can be used to successfully detect $Cl_2$. Furthermore, we have shown that the system is very selective to $Cl_2$, and that other compounds cannot change the orientation of doped composition on the gold metal surface only $Cl_2$. Finally, in contrast to the $Mn^{2+}$-containing system disclosed in Example 2, this system can detect chlorine in the absence of water.

Example 4: Additional Details for LC-Based Detection of $Cl_2$ Using a Gold Metal Substrate Surface, as Disclosed in Example 3

This example provides additional details and supporting data regarding the methods of using gold metal as a surface substrate in the doped liquid crystal-based systems and methods for detecting $Cl_2$ that were illustrated above in Example 3.

Summary

Elementary reaction steps, including adsorption and dissociation, of a range of molecular adsorbates on transition metal surfaces have been elucidated in the context of heterogeneous catalysis. In this example, we leverage this knowledge to design a surface-supported films of liquid crystal (LC) that are triggered to undergo an orientational transition upon dissociative adsorption of chlorine on ultrathin polycrystalline gold film (predominant crystallographic face is (111)), thus amplifying atomic-scale surface processes in situ into macroscopic optical signals.

First-principles electronic structure calculations predicted that 4'-n-pentyl-4-biphenylcarbonitrile (5CB), a room temperature nematic LC, does not bind to Au(111) in an orientation that changes upon dissociative adsorption of molecular chlorine on the Au(111) surface, a result that was validated by experiment. 4-Cyano-4-biphenylcarboxylic acid (CBCA), however, was calculated to bind strongly with a well-defined orientation via the carboxylic acid group, which we observed in experiments to lead to a perpendicular orientation of nematic mixtures of 5CB and CBCA. Specifically, 0.002 mol % CBCA in 5CB, which corresponds to, at most, ~¼ monolayer coverage of CBCA on the gold surface, is sufficient to cause a homeotropic orientation of the LC. Dissociative adsorption of $Cl_2$ gas on the gold surface displaces CBCA from Au(111) to trigger a change in orientation of the nematic LC from homeotropic to planar. CBCA/5CB mixtures were triggered by 1 ppm $Cl_2$ within 7 mins and by 200 ppb within 20 mins, thus providing sufficient sensitivity and speed of response to permit personal monitoring of exposure to $Cl_2$.

Introduction

This example is focused on noble metal surfaces (Au (111)) and the interaction of molecular chlorine and molecules containing carboxylic acids or nitrile groups with this surface. Our focus on chlorine gas ($Cl_2$) was motivated by the observation that $Cl_2$ dissociatively adsorbs on Au(111). Carboxylic acids were selected as a second class of adsorbates to study because they can participate in dehydrogenation and other reactions on Au(111) surfaces. This example also involves the interaction of nitrile-functionalized molecules with Au(111).

Specifically, we combine and develop further our understanding of the relevant atomic scale processes occurring on Au(111) through a combination of predictive first-principles electronic structure calculations and experiment, and leverage that understanding to identify interfacial designs that couple the dissociative adsorption of chlorine gas to orientational transitions involving carboxylic acid-containing LCs on surfaces. We find that the orientational transitions occur with dynamics and sensitivity to concentrations of $Cl_2$ in gaseous phases that appear potentially promising as the basis of new designs of wearable sensors for measurement of human exposure to $Cl_2$ gas. We also show that the optical response of the LC is selective to $Cl_2$ over a range of other gases including $N_2$, dimethyl methylphosphonate, ammonia, ethylene oxide, and formaldehyde.

Materials and Methods

Computational methods. All calculations were performed using Density Functional Theory, as implemented in the Vienna Ab initio Simulation Package (VASP) code. Projector augmented wave potentials were used to describe the electron-ion interactions, and the exchange-correlation functional was described by the generalized gradient approximation (GGA-PBE). Dispersion corrections were used in all calculations employing Grimme's D3 empirical dispersion correction scheme with zero damping. The electron wave function was expanded using plane waves with an energy cutoff of 400 eV in geometry optimization. The Brillouin zone (BZ) of Au(111) was sampled using (4×4×1) Γ-centered Monkhorst-Pack k-point mesh in case of the (3×3) unit cell and (3×3×1) Γ-centered Monkhorst-Pack k-point mesh for the (4×4) unit cell. In all calculations, the Methfessel-Paxton smearing method was used with 0.1 eV smearing. Structures were relaxed until the Hellmann-Feynman forces acting on each atom were less than 0.02 eV $Å^{-1}$.

The resulting calculated lattice constant of 4.12 Å is in good agreement with the experimental value of 4.08 Å. The gold surface was modeled using the most stable (111) facet with a four-layer slab. The two bottom layers of the slab were fixed in their bulk positions, while the two top layers of Au atoms were relaxed in all calculations. The Au slab images were separated by a distance of 25 Å to ensure that adsorbed benzonitrile (PhCN) molecules, which were used as surrogates of 4'-n-pentyl-4-biphenylcarbonitrile (5CB), did not decrease the vacuum layer separating the images below 15 Å, even in case of a perpendicular orientation of the PhCN adsorbates. Dipole correction was used to eliminate residual interaction between images through the vacuum layer.

To allow for parallel adsorbed states of PhCN, a (4×4) unit cell was used to model Au(111). A (3×3) unit cell was used for chlorine adsorption on Au(111) because previous theoretical and experimental studies suggested that Cl atoms prefer a (√3×√3)R30° overlayer on that surface. The binding of other analytes ($N_2$, dimethyl methylphosphonate, ammonia, ethylene oxide, and formaldehyde) was also evaluated in a (3×3) unit cell with one analyte in the simulation box. The binding energy (BE) of an adsorbate is defined by $BE=E_{total}-E_{substrate}-E_{gas\ phase\ adsorbate}$ where $E_{total}$ is the total energy of the entire adsorbate-slab system, $E_{substrate}$ is the total energy of the clean Au(111) slab itself, and $E_{gas\text{-}phase\ adsorbate}$ is the total energy of the isolated adsorbate in the gas phase. By this definition, a more negative BE value reflects a stronger binding to the surface. In the case of $Cl_2$, BEs are referenced to $Cl_2(g)$, thus incorporating the dissociation of $Cl_2(g)$ molecules to obtain surface bound Cl species. Additionally, BEs of PhCOO are referenced to PhCOOH(g), $H_2O$(g), and $O_2$(g), as the generation of surface-bound PhCOO involves formation of water.

Calculation of $O_2$ dissociation to atomic O is known to be difficult to calculate with standard DFT methods. Accordingly, we used the experimentally measured bond-dissociation energy (5.12 eV).

Materials: The precursor 4-bromobenzoic acid was purchased from Synquest Laboratories (Alachua, Fla.). The 4-cyanophenylboronic acid was purchased from Combi-Blocks (San Diego, Calif.). $PdCl_2$ for the synthesis of $Pd(PPh_3)_4$ was bought from Pressure Chemical (Pittsburgh, Pa.). Potassium carbonate and 1,4-dioxane were bought from Alfa Aesar (Ward Hill, Mass.). Methanol was purchased from VMR (West Chester, Pa.). Ethanol, hydrochloric acid (37%) and sulfuric acid (98%) were bought from Sigma-Aldrich (Milwaukee, Wis.). Ether and t-BuONa were purchased from Acros. Titanium (99.999%) and gold (99.999) were purchased from Advanced Materials (Spring Valley, N.Y.). Methanol and Fischer's Finest glass slides were purchased from Fischer Scientific (Pittsburgh, Pa.). Silicon wafers were purchased from Silicon Sense (Nashua, N.H.). $Cl_2$ in nitrogen gas at a concentration of 10 ppm was obtained from Airgas (Radnor Township, Pa.)) and used as received. All chemicals and solvents were of analytical reagent grade and were used as received without any further purification. Fiber spacers with 5 μm-diameter were purchased from EM industries, Inc (Hawthorne, N.Y.).

Synthesis of 4'-cyanobiphenyl-4-carboxylic acid (CBCA). A 100 ml round bottom flask fitted with a magnetic stir bar was charged with 4-bromobenzoic acid (2.01, 10.0 mmol) and a mixed solvent comprising $H_2O$ (6.0 ml) and 1,4-dioxane (15.0 ml), $Pd(PPh_3)_4$ (115 mg, 1.0 mol %). To this suspension was added 4-cyanophenylboronic acid (1.70 g, 15.0 mmol, 1.5 equiv.) and potassium carbonate (2.76 g, 20.0 mmol, 2.0 equiv.). This mixture was refluxed and the reaction was monitored by thin layer chromatography (TLC) analysis until completion. After cooling to room temperature, the mixture was filtered through a Celite pad and the pad was washed with a 1:1 mixture of $H_2O$/methanol (400 ml). The filtrate was then acidified with 10% hydrochloric acid dropwise until pH=4~4.5. The precipitate was collected by vacuum filtration and washed with water. The crude product was then recrystallized from methanol to afford white crystals (1.1 g, 50%). K 268 N 315 I (ref. K 266 N 315 $I^{36}$) $^1$H NMR (DMSO-$d_6$, 400 MHz) δ (ppm): 13.13 (s, 1H), 8.05 (m, 2H), 7.98 (m, 4H), 7.91 (m, 2H).

Synthesis of 4'-cyanobiphenyl-4-carboxylic methyl ester (CBCM).[37] In a 50 ml round bottom flask fitted with a magnetic stir bar, 4'-cyanobiphenyl-4-carboxylic acid (400 mg) was dissolved in methanol (20.0 ml) followed by the addition of a catalytic amount of concentrated sulfuric acid. The resulting mixture was stirred at reflux overnight. TLC analysis indicated that the starting acid was consumed. The reaction was cooled and the precipitate was filtered by vacuum to give a white solid. This crude product was then recrystallized from ethanol to afford white crystals (330 mg, 78%). GC-MS: 237.13 found 237.25 calc. $^1$H NMR (CDCl$_3$, 400 MHz) δ (ppm): 8.13 (m, 2H), 7.75 (m, 2H), 7.72 (m, 2H), 7.66 (m, 2H), 3.95 (s, 3H); NMR (CDCl$_3$, 100 MHz) δ (ppm): 166.6, 144.4, 143.4, 132.7, 130.4, 130.2, 127.9, 127.3, 118.7, 111.8, 52.3.

Synthesis of sodium 4'-cyanobiphenyl-4-carboxylate (CBCNa).[38] In a 50 ml round bottom flask fitted with a magnetic stir bar, 4'-cyanobiphenyl-4-carboxylic acid (446 mg, 2.0 mmol) was dissolved in ethanol (10.0 ml). To the resulting suspension was added a solution of t-BuONa (192 mg, 2.0 mmol) in 10.0 ml ethanol dropwise. Once the addition was complete, the resulting mixture was stirred at room temperature overnight. The precipitate was filtered by vacuum and washed with ethanol (3×5.0 ml) and ether (3×5.0 ml). The desired product was then obtained as an off-white solid (410 mg, 84%). MP>300° C. $^1$H NMR (DMSO-d$_6$, 400 MHz) δ (ppm): 7.96 (d,J=8.0 Hz, 2H), 7.90 (m, 4H), 7.65 (d, J=8.0 Hz, 2H); NMR (DMSO-d$_6$, 100 MHz) δ (ppm): 169.1, 145.3, 141.9, 138.4, 133.3, 130.2, 128.0, 126.3, 119.4, 110.2.

Cleaning of Glass Substrates: Glass microscope slides were cleaned according to published procedures using an acidic piranha solution [70:30 (% v/v) H$_2$SO$_4$:H$_2$O$_2$ (30%)]. Briefly, the glass slides were immersed in a piranha bath at 60-80° C. for at least 1 h, and then rinsed in running deionized water for 2-3 min. The slides were then immersed in basic piranha solution [70:30 (% v/v) KOH (45%):H$_2$O$_2$ (30%)] and heated to between 60 and 80° C. for at least 1 h. Finally, the slides were rinsed sequentially in deionized water, ethanol, and methanol, and then dried under a stream of nitrogen. The clean slides were stored in a vacuum oven at 110° C. overnight. All other glassware was cleaned prior to use.

Preparation of Substrates for Anchoring and Anchoring Transitions Studies: Semitransparent films of gold with thicknesses of 200 Å were deposited onto piranha-cleaned glass slides mounted on a fixed holder within an electron-beam evaporator (VEC-3000-C manufactured by Tekvac Industries, Brentwood, N.Y.). A layer of titanium (thickness 20 Å) was used to promote adhesion between the glass microscope slides and the films of gold. The rates of deposition of both gold and titanium were 0.2 Å/s. The pressure in the evaporator was maintained at less than 3×10$^{-6}$ Torr before and during the deposition.

Preparation of Substrates for X-Ray Photoelectron and Infrared Spectroscopy: Substrates used for the infrared (IR) and X-ray photoelectron spectroscopy (XPS) were prepared by sequential deposition of 100 Å of titanium and 1000 Å of gold onto silicon wafers. The gold-coated silicon wafers were then cut to 15 mm×30 mm pieces, rinsed with ethanol and dried under a gaseous stream of nitrogen. For IR studies, 100 μL of 2 mM CBCA in ethanol was spin coated onto each slide at 3000 rpm for 30 s. For XPS, the slides were exposed to gaseous 1 ppm Cl$_2$ for 1 hr.

Characterization of Orientations of LCs in Optical Cells: We measured the orientations of LCs by fabricating optical cells from two gold surfaces that were aligned facing each other and spaced apart using a glass spacer with a diameter of 5 μm. Next, 2 μL of 5CB (with or without added CBCA), heated to form an isotropic phase (35° C.<T<40° C.), was drawn into the cavity between the two surfaces of the optical cell by capillarity. The optical appearance of the LC film so-formed was characterized by using an Olympus BX-60 polarizing light microscope in transmission mode (Olympus, Japan). Conoscopic imaging of the LC films was performed by inserting a Bertran lens into the optical path of a polarized-light microscope to distinguish between homeotropic and isotropic films.

Ellipsometry. The optical thicknesses of CBCA, CBCM and CBCNa deposited by spin-coating onto the gold films were measured using a Gaertner LSE ellipsometer at a wavelength of 632.8 nm and an angle of incidence of 70° and by assuming the deposited film to have a refractive index of n=1.6.

Preparation of Micrometer-Thick Films of LC with Free Surface: An 18 μm-thick copper-coated transmission electron microscopy (TEM) grid (Electron Microscopy Sciences, Hatfield, Pa.) was placed onto the surface of a semitransparent gold film. The TEM grids had square pores with lateral dimensions of 285 μm and an overall diameter of 3 mm. 0.1 μL of 5CB was deposited into each TEM grid using a glass capillary. The excess LC was removed from the grids by wicking the LC into an empty capillary tube.

Anchoring Transitions Induced by Cl$_2$: LC samples hosted within TEM grids supported on gold films were exposed to a stream of nitrogen containing Cl$_2$ within a flow cell that was constructed to direct the gaseous flow across the LC samples while permitting observation of the samples through a polarized-light microscope (CH40, Olympus, Melville, N.Y.). The stream of gas containing Cl$_2$ was generated from a certified cylinder containing 10 ppm Cl$_2$ in nitrogen, and diluted to using nitrogen to 1 ppm (see Materials for purity). The flow rate of the gas through the flow cell was controlled to be 1000 mL/min using a series of rotameters (Aalborg Instruments & Controls, Inc., Orangeburg, N.Y.).

X-ray Photoelectron Spectroscopy (XPS): X-ray photoelectron spectroscopy was performed with a Perkin-Elmer PhiX 5400 spectrometer. The X-ray source was Mg Kα, and the scanning window was 2 mm×1 mm. Survey scans were performed for 10 cycles with a pass energy of 89.45 eV to identify elements present on the surface. The survey scan was then followed by element-specific acquisitions for Cl at 198.5 eV for twenty cycles. The major peak was Cl (2p).

Fourier Transform Infrared Spectroscopy (FTIR): Transmission IR measurements were performed using a Bruker Vector 33 FTIR spectrometer (Bruker Optics Inc, Billerica, Mass., USA). For each sample, 32 scans were acquired at a resolution of 5 cm$^{-1}$. The data obtained was processed and plotted using OPUS software.

Fourier Transformed Polarization-Modulation IR Reflectance Absorbance Spectroscopy (PM-IRRAS): IR spectra of CBCA, CBCM and CBCNa films deposited onto gold surfaces were obtained using a Nicolet Magna-IR 860 FT-IR spectrometer with a photoelastic modulator (PEM-90, Hinds Instruments, Hillsboro, Oreg.), synchronous sampling demodulator (SSD-100, GWCTechnologies, Madison, Wis.), and a liquid N$_2$-cooled mercury cadmium telluride (MCT) detector. All spectra (1000-4000 cm-1) were recorded at an incident angle of 83° with the modulation centered at 2200 cm$^{-1}$. For each sample, 1000 scans were taken at a resolution of 4 cm$^{-1}$. Data were collected as differential reflectance vs wavenumber, and spectra were normalized and converted to absorbance units via the method outlined in Frey et al. (Frey, B. L.; Corn, R. M.; Weibel, S. C. Polarization-Modulation Appproaches to Reflection-Absorption Spectroscopy. In *Handbook of Vibrational Spectroscopy;* 2001; pp 1042-1056).

Results and Discussion

Influence of Atomic Cl Adsorbates on the Orientations of Nitrile-Containing LCs on Au(111)

Past studies have demonstrated that $Cl_2$ undergoes dissociative adsorption on Au(111) surfaces. Our initial calculations and experiments sought to determine if the nitrile-containing LCs bind to Au(111) surfaces in orientations that differ depending on whether or not the Au(111) surfaces is decorated with a bound Cl overlayer. In the absence of bound Cl, our simulations revealed that PhCN (surrogate for 5CB) aligns parallel to the surface in the most stable coordination mode (Table 3). In this preferred orientation, the interaction between the PhCN and the surface is dominated by dispersion interaction (Table 3). A feature of this binding mode is that the phenyl ring prefers to lay above a hollow site in the most stable structure, although we note that the energy difference between the different stable minima is very small (<0.05 eV). As a result of the parallel binding mode, we predicted that nematic phases formed from 5CB would likely adopt a parallel orientation on Au(111) surfaces. We also predicted that the presence of bound Cl would likely not change the parallel orientation of 5CB as additional calculations revealed that Cl chemisorption on the Au(111) surface did not interfere with the physisorption of PhCN in the parallel orientation.

We validated the above-described computational predictions by experiment. Briefly, we determined that the orientation of 5CB on polycrystalline Au films (predominant surface orientation Au(111)) is parallel, and that the orientation does not change when Cl is bound to the surface. These preliminary results guided our subsequent efforts, as described below, to identify functional groups that could be introduced into LCs to drive the LCs to undergo orientational transitions upon dissociative adsorption of $Cl_2$ gas on Au(111) surfaces.

TABLE 3

Binding energy of adsorbates on Au(111) in parallel and perpendicular orientations with respect to the gold surface. All energies are in eV. Binding energy is defined relative to the gas-phase energy of the identical species except Cl where $Cl_2(g)$ is the reference state and PhCOO where PhCOOH(g) is the reference state (see details in Methods). Coverage in units of monolayer (ML).

| Molecule | Parallel | Perpendicular | Coverage |
| --- | --- | --- | --- |
| PhCN | −0.91 | −0.31 | 1/16 |
| PhCOOH | −0.93 | −0.36 | 1/16 |
| PhCOO | −0.92 | −1.15 | 1/16 |
| PhCOONa | −1.01 | −0.51 | 1/16 |
| PhCOOMe | −1.08 | −0.42 | 1/16 |
| Cl | | −3.36 | 1/3 |

Interactions of Molecules with Carboxyl, Carboxylate Ester and Carboxylate Groups with Au(111) Surfaces Guided by the results described above, and prior reports of the various modes of interaction of molecules containing carboxylic acid groups with Au(111) surfaces, we carried out first-principles calculations to gain insight into the interaction of the model compounds PhCOOH, PhCOO, PhCOONa or PhCOOMe with Au(111) to determine their energetically preferred orientations (Table 3). Similar to PhCN, we found that PhCOOH, PhCOONa, and PhCOOMe aligned parallel to the surface in the most stable adsorbed state (Table 3). Here again, the interaction between each adsorbate and the Au(111) surface is dominated by dispersion interactions (Table 3). Interestingly, for PhCOO, however, a perpendicular orientation (relative to the gold surface) was predicted to be the energetically favored adsorbed state (Table 3). This preferred orientation arises because the O atoms in PhCOO were calculated to bind to the top sites of the Au(111) surface. However because the O—O distance within PhCOO is only 2.11 Å while the Au—Au distance on the Au(111) surface is 2.91 Å, binding of PhCOO through two O atoms can be optimally aligned only with the tops of two gold atoms. We note also that the interaction of the O atoms of PhCOO with the Au atoms results in a binding energy that is substantially stronger than that calculated for the other molecules shown in Table 3, which interact largely via dispersion interactions. As a result of the strong perpendicular binding of PhCOO, we hypothesized that dehydrogenated carboxylic groups may form on Au(111) surfaces and induce homeotropic orientation on gold surface, and thus be good candidates for reporting the presence of atomic Cl adsorbates.

Guided by these theoretical predictions that the interaction of the aromatic carboxyl groups with Au(111) will promote a perpendicular orientation of the carboxylate adsorbates, we synthesized 4-cyano-4-biphenylcarboxylic acid (CBCA). For use in control experiments, we synthesized also 4-cyano-4-biphenylcarboxylic methyl ester (CBCM; acid converted to ester) and sodium-4-cyano-4-biphenylcarboxylate (CBCNa; acid converted to sodium salt). By using differential scanning calorimetry (DSC), we determined that CBCA exhibited a nematic phase from 268 to 315° C. and decomposed at higher temperatures. In contrast, CBCM and CBCNa did not exhibit a nematic phase in pure form between 25 to 300° C. (POM). Accordingly, to create nematic phases at room temperature, we mixed CBCA, CBCM or CBCNa with 5CB which, as described above, binds weakly and gives rise to planar anchoring on Au(111) surfaces.

We characterized the orientations of LC mixtures containing 0.1 mol % of CBCA, CBCM or CBCNa in 5CB on gold films using procedures detailed under Methods. As reported above, we performed these measurements using evaporated films of gold, for which past studies by us and others have established the predominant crystallographic orientation to be Au(111). We observed a homeotropic orientation of the CBCA-5CB mixture, and planar orientations for the CBCM-5CB and CBCNa-5CB mixtures. To further support our conclusion that binding of CBCA to Au is responsible for the homeotropic orientation of nematic CBCA-5CB, the mixture was deposited onto borosilicate surfaces and the surfaces of silicon wafers covered with a native oxide, both which gave planar orientations of the LC. When gold was deposited onto the silicon wafer with the native oxide, the CBCA-5CB mixture assumed a homeotropic orientation. When combined, these results are consistent with the interaction between CBCA and gold giving rise to the homeotropic orientation of the CBCA-5CB mixture.

Computational Predictions and Experimental Characterization of the Influence of Cl Adatoms on the Orientations of LCs on Au(111)

Figure 12A:
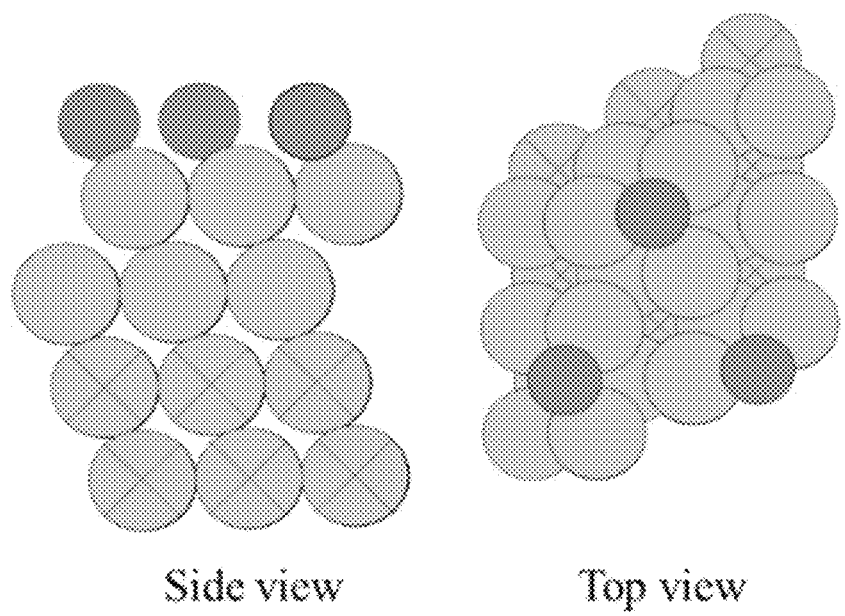
FIG. 12A shows the calculated structure of ⅓ monolayer Cl on ⅓ monolayer Cl pre-covered Au(111) surface in a (3×3) unit cell. Green and yellow colors indicate Cl and Au atoms, respectively. Crossed atoms were not allowed to relax during energy minimization.
Figure 12B:
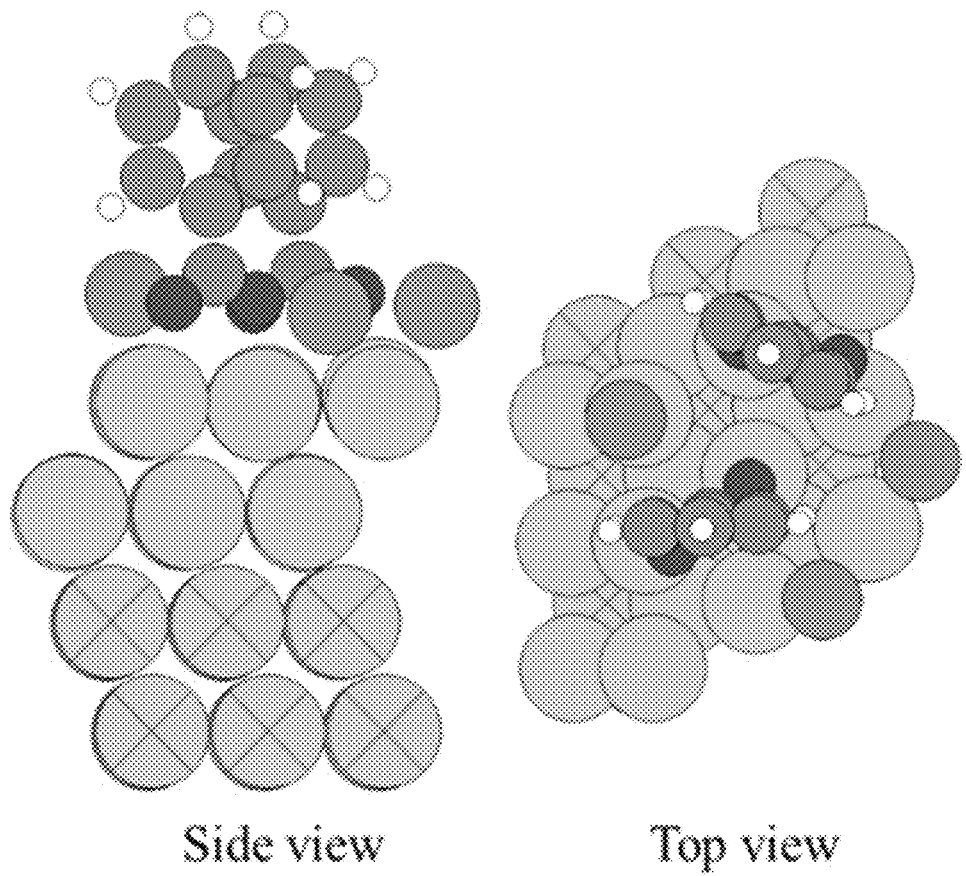
FIG. 12B shows the calculated structure of ⅔ monolayer of PhCOO on ⅓ monolayer Cl pre-covered Au(111) surface in a (3×3) unit cell. White, grey, green, red, and yellow colors indicate H, C, Cl, O, Au atoms, respectively. Crossed atoms were not allowed to relax during energy minimization.

Our focus on Au(111) surfaces was motivated by past studies that have reported that $Cl_2$ dissociates on Au(111)

surfaces to form a (√3×√3)R30° overlayer of Cl atoms via an exothermic reaction of −3.36 eV (Table 3). To explore the effect of chlorine adatoms on the preferred orientation of dehydrogenated CBCA, we calculated the binding of PhCOO on a (√3×√3)R30° chlorine-covered Au(111) surface (FIGS. 12A and 12B). This calculation was performed by placing the Cl atoms in their most stable face-centered-cubic (FCC) hollow sites (FIG. 12A), introducing two PhCOO molecules and then searching for their most stable adsorption configuration. As shown in FIG. 12B, the Cl atoms significantly reorganized on the surface to provide space for the PhCOO molecules. Because the binding of Cl is almost identical (within 0.05 eV) in FCC and hexagonal-close-packed (HCP) hollow sites and bridge sites on Au(111), moving the Cl adatoms away from their preferred FCC sites does not involve a significant energy penalty. On the other hand, PhCOO prefers exclusively top sites on the clean Au(111) surface, and a similar binding mode is found on Cl covered surfaces.

We also investigated $Cl_2$ adsorption on PhCOO covered Au(111) surfaces, as a function of PhCOO coverage. We found that chlorine can spontaneously adsorb even in the presence of 3 PhCOO species in a (3×3) unit cell, which is the maximum surface coverage for PhCOO in a (3×3) unit cell. This result suggests that Cl adsorption is energetically favorable and Cl should adsorb in the presence of LC on Au(111). To understand the effect of adsorbed Cl on the surface-bound LC layer, we compared the optimal surface coverage of PhCOO on clean and ⅓ ML pre-adsorbed Cl covered Au(111) surface in a (3×3) unit cell. As noted above, we found that 3 PhCOO species can favorable adsorb on clean Au(111) in a (3×3) unit cell by a total BE of −2.84 eV while the adsorption of the fourth PhCOO is energetically not preferred; the differential BE is positive +0.45 eV. The same analysis on ⅓ ML pre-adsorbed Cl covered Au(111) showed that only two PhCOO can favorable adsorb by a total BE of −2.01 eV (FIG. 12B) and the adsorption of the third PhCOO is not favored; differential BE is +0.21 eV. Therefore, we concluded that increasing Cl coverage decreases the coverage of CBCA-derived carboxylate on the surface, which may lead to an orientational transition of CBCA doped 5CB on a gold surface.

To assess the above-described computational predictions, CBCA-5CB mixtures with a range of CBCA concentrations (0.005 mol %, 0.002 mol % and 0.001 mol %) were deposited onto gold films and subsequently exposed to gaseous $Cl_2$. The CBCA-5CB mixture containing the lowest concentration of CBCA (0.001 mol %) did not exhibit a homeotropic orientation, while the two mixtures with CBCA concentrations of 0.002 mol % and 0.005 mol % induced the homeotropic orientation. Because the BE of CBCA to Au(111) surfaces is highly favorable relative to 5CB (Table 3) and the equilibrium constant of the binding exchange process is calculated to be K=1.13×10⁴, we expect that almost all CBCA molecules in the 5CB mixture will be bound to the Au(111) surface. For the mixture containing 0.001 mol % CBCA in 5CB, we calculate that CBCA molecules cover only ⅛ of the total gold surface, a concentration that our results indicate is insufficient to cause a homeotropic orientation of the LC.

We exposed the Au(111)-supported LC mixtures containing 0.002 mol % and 0.005 mol % CBCA in 5CB to a nitrogen stream containing 1 ppm $Cl_2$. The CBCA-5CB mixtures transition away from the initial homeotropic orientation upon exposure to $Cl_2$. The change we observed in optical interference colors generated using white-light illumination is consistent with the LC assuming a planar orientation on the gold surface decorated with Cl adatoms. Subsequent exposure of the samples to $N_2$ for 1 hr did not result in a change in the orientation of the LC. The irreversible optical response of the LC to Cl adsorption is consistent with strong binding of Cl to Au (111).

The mixture of 5CB and 0.002 mol % CBCA exhibited an anchoring transition with dynamics that were faster than 5CB mixed with 0.005 mol % CBCA, presumably because $Cl_2$ has to displace more CBCA from the Au(111) surface in the 0.005 mol % CBCA sample than that for the 0.002 mol % CBCA sample to trigger the anchoring transition of the LC.

We performed several control experiments to confirm that the observed optical response of the LC is triggered by dissociative adsorption of $Cl_2$ on the surface of the gold film. Because $Cl_2$ is a strong oxidizing agent, we evaluated whether oxidation of bulk 5CB plays a role in the optical response observed. As shown in Table 4, we measured the nematic-to-isotropic transition temperature (TNT) of the CBCA-5CB mixture to not measurably change upon exposure to 1 ppm $Cl_2$ for one hour, well beyond the timescales of the observed chemoresponses. Additionally, we performed a second control experiment in which a gold film was sequentially exposed to $Cl_2$ gas and then to the CBCA-5CB mixture—the LC exhibited a planar orientation on the Au surface pre-exposed to the $Cl_2$ gas.

We also performed XPS measurements of Au films before and after exposure to $Cl_2$. After exposure, a peak corresponding to Cl 2p at 197.7 eV was clearly evident. In contrast, no equivalent peak was evident on the Au surface prior to exposure to the $Cl_2$ gas. Additionally, we deposited a thin film of CBCA onto a gold surface pre-exposed to $Cl_2$ and performed PM-IRRAS. The IR absorption corresponding to the nitrile peak that was evident prior to the exposure to $Cl_2$ disappeared on the $Cl_2$-treated Au gold surface. This result is consistent with displacement of the CBCA from its perpendicular orientation on the Au surface with Cl adatoms, thus causing the planar orientation of the LC film. Overall, these experiments provide additional support for our conclusion that the observed orientational response is due to dissociative adsorption of $Cl_2$ on the surface of the supporting Au films.

TABLE 4

$T_{NI}$ of 5CB-CBCA mixtures before and after exposed to a gaseous 1 ppm $Cl_2$

| $C_{CBCA}$ in 5CB (mol %) | 0 | 0.002 | 0.005 |
|---|---|---|---|
| $T_{NI}$ before exposure | 35.5 | 35.5 | 35.5 |
| $T_{NI}$ at 60 mins | 35.5 | 35.5 | 35.5 |

Sensitivity and Selectivity

Figure 13:
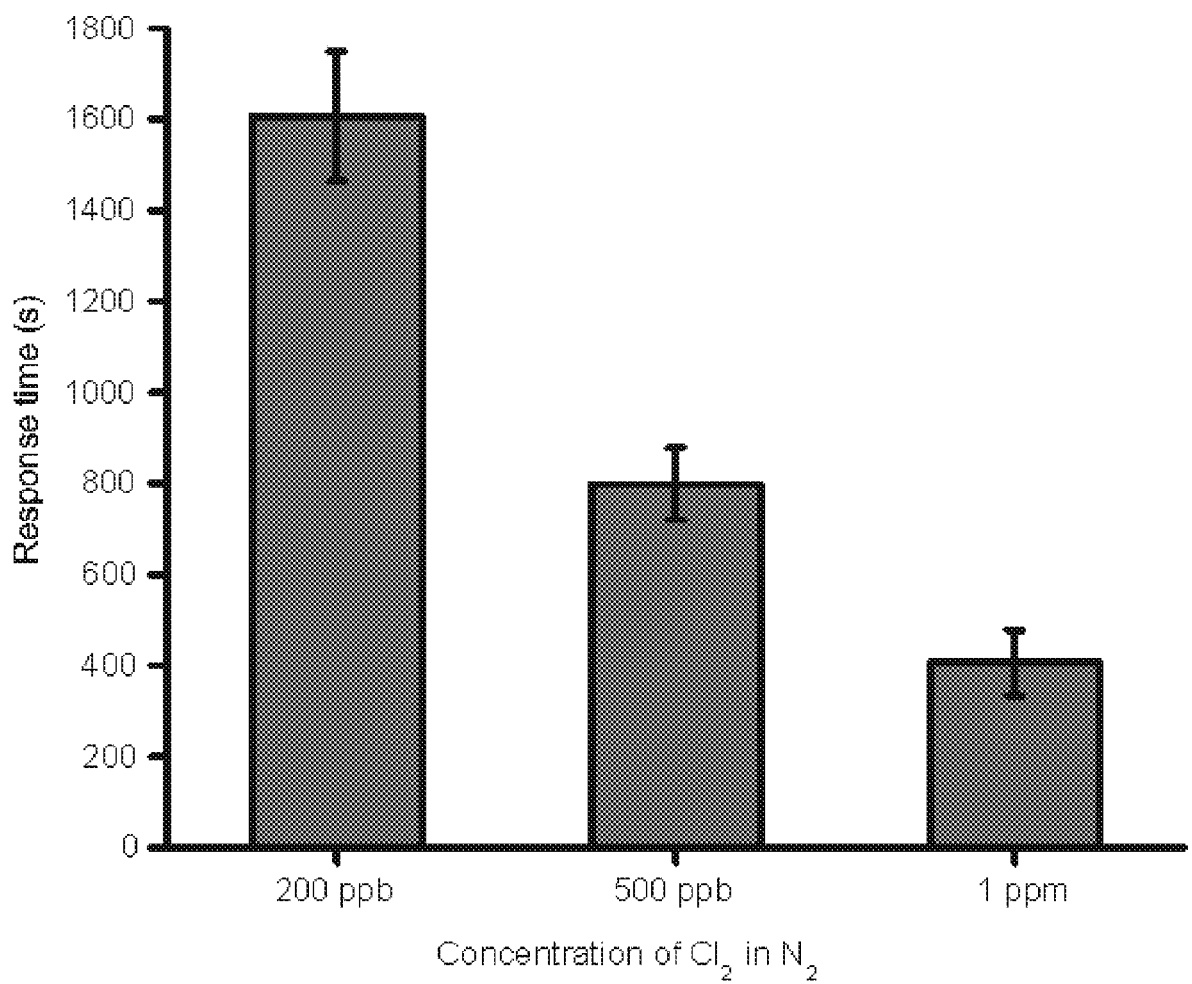
FIG. 13 is a bar graph showing averaged response time of CBCA-5CB ($C_{CBCA}$=0.002 mol %) mixtures on gold films to 0.2 ppm, 0.5 ppm and 1 ppm $Cl_2$ in $N_2$. The response time is defined as the time required to reach 80% normalized light intensity of full response.

Personal exposure to $Cl_2$ gas is a potential work-place hazard, and deliberate exposure has been used both historically and recently as a tool of chemical warfare. To determine the relevance of our findings as the basis of future measurement tools to protect against human exposure to $Cl_2$ gas, we determined the time taken for the CBCA-5CB mixture to respond to human exposure limits specified by the US occupational Safety and Health Administration (OSHA). OSHA specifies short-term exposure limit for humans to be 15 minutes at 1 ppm $Cl_2$. We defined the response time of the LC as the time to reach 80% of the full optical response of the LC. Inspection of FIG. 13 reveals that the response time of the CBCA-5CB mixture ($C_{CBCA}$=0.002 mol %) to 1 ppm $Cl_2$ was 7 minutes, well within the 15 min exposure limit. OSHA also specifies an 8-hour exposure limit (time-weighted average) as 500 ppb $Cl_2$. Accordingly, we characterized the dynamic response of CBCA-5CB mixtures ($C_{CBCA}$=0.002 mol %) supported on the Au films following exposure to 200 ppb or 500 ppb $Cl_2$. Inspection of FIG. 13 reveals that the LC mixture responds to 500 ppb $Cl_2$ within 14 mins and to 200 ppb $Cl_2$ within 28 mins, establishing the relevancy of our results to long-term human exposure monitoring to $Cl_2$ gas.

We also investigated the selectivity of our LC-based system to other analytes such as gaseous $N_2$, dimethyl methylphosphonate (DMMP), ammonia, ethylene oxide, and formaldehyde. Our computational results suggest very weak binding for all of these compounds to Au(111) surfaces relative to CBCA and, therefore, we predicted that the 5CB-CBCA mixture should not respond to these potentially interfering compounds. Consistent with this prediction, following exposure of the CBCA-5CB mixture ($C_{CBCA}$=0.002 mol %) to 80% relative humidity in $N_2$ and 5 ppm (in $N_2$) DMMP, ammonia, ethylene oxide, and formaldehyde for 1 hour, we did not observe any change in the orientation of the LC. This result is consistent with a selectivity based on dissociative adsorption of $Cl_2$ on the Au surface in the presence of CBCA.

Previous studies have reported various principles and devices for the detection of chlorine gas. For example, metal oxide-based sensors, such as $CdSnO_3$, $In_2O_3$ and ZnO, have been reported to detect chlorine gas below 1 ppm. However, these require operation at temperatures above 100° C. In contrast, a Sb-doped $SnO_2$ sensor has been reported to detect chlorine gas at room temperature, but it failed to detect chlorine gas below 1 ppm. Additionally, traditional sensors are expensive and not well-suited to use as wearable devices for measurement of human exposure to chemical environments.

CONCLUSION

The key result reported in this example is the design of a LC system that amplifies the dissociative adsorption of $Cl_2$ on Au surfaces into an orientational transition of a LC film pre-adsorbed on the Au surfaces. A key advantage of this approach in the context of designing chemoresponsive LCs is the stability of the Au(111)-LC interface relative to metal salt-decorated surfaces that we have shown previously to permit reporting of binding and redox processes using LCs. More broadly, the results reported in this example are significant because they demonstrate that it is possible to leverage past studies of elementary reaction steps on metal surfaces performed in the context of surface science and heterogeneous catalysis to design surfaces that orient LCs and trigger orientational transitions in LCs in response to targeted atomic-scale surface processes. Specifically, we used a combination of computational chemistry methods and experiments to show that aromatic molecules with carboxylic acid groups exhibit strong directional binding of adsorbates to gold surfaces as a consequence of the dehydrogenation of the carboxylic group. Dissociative adsorption of $Cl_2$ gas on the Au surface weakens the binding of the dehydrogenated carboxylic acids to trigger orientation changes in LCs doped with the aromatic carboxylic acids.

Together, these examples demonstrate the use of liquid crystal-based detection methods to successfully detect chlorine gas.

The invention is not limited to the embodiments set forth in this disclosure for illustration, but includes everything that is within the scope of the claims. Furthermore, all documents cited in this disclosure are hereby incorporated by reference in their entirety and for all purposes as if fully set forth in this disclosure.

We claim:

1. A device for detecting chlorine gas, the device comprising:
   (a) a substrate having a surface comprising either:
      (i) one or more metal cations capable of binding a liquid crystal strongly enough to cause homeotropic ordering of the liquid crystal in contact with the substrate surface and having an oxidized state that is not capable of binding the liquid crystal strongly enough to cause homeotropic ordering of a liquid crystal in contact with the substrate surface, wherein the one or more metal cations are capable of being oxidized to the oxidized state by chlorine gas, and wherein the one or more metal cations are not capable of being oxidized to the oxidized state by the oxygen in air; or
      (ii) a metal capable of binding a mixture comprising a liquid crystal and a sensitizer molecule strongly enough to cause homeotropic ordering of such a mixture in contact with the substrate surface in the absence of chlorine, but not when chlorine atoms are dissociatively bound to the substrate surface; and
   (b) a composition comprising a liquid crystal that is in contact with the substrate surface, wherein if the substrate surface comprises the metal, the composition further comprises the sensitizer molecule;
   wherein the liquid crystal is capable of changing its orientational ordering when $Cl_2$ comes in contact with the substrate surface.

2. The device of claim 1, wherein the substrate surface comprises the one or more metal cations, and wherein the one or more metal cations include $Mn^{2+}$.

3. The device of claim 1, wherein the substrate surface comprises the metal, and wherein the metal is gold.

4. The device of claim 1, wherein the substrate surface comprises the metal, and wherein the sensitizer molecule comprises a carboxylic acid or carboxylate terminus.

5. The device of claim 4, wherein the sensitizer molecule is a liquid crystal that is modified to include a carboxylic acid or carboxylate terminus.

6. The device of claim 1, wherein the concentration of the sensitizer molecule within the composition comprising the liquid crystal is from about 0.001 mol % to about 5.0 mol % sensitizer molecule.

7. A method for detecting the presence of chlorine in a sample, the method comprising:
   (a) contacting the liquid crystal in a device according to claim 1 with the sample; and
   (b) observing the orientational ordering of the liquid crystal in the device;
   wherein an observed change in the orientational ordering of the liquid crystal indicates that chlorine is present in the sample.

8. The method of claim 7, further comprising quantifying the amount of chlorine in the sample, wherein the quantity of chlorine in the sample is correlated with the speed or extent of the observed change in orientational ordering.

9. The method of claim 7, wherein the substrate surface of the device comprises the one or more metal cations, and wherein the one or more metal cations include $Mn^{2+}$.

10. The method of claim 9, wherein chlorine is detected, and wherein when the chlorine contacts the substrate surface, one or more $Mn^{2+}$ cations are oxidized to $Mn^{4+}$ cations.

11. The method of claim 7, wherein the substrate surface of the device comprises a metal, and wherein the metal is gold.

12. The method of claim 11, wherein the sensitizer molecule included in the composition of the device comprises a carboxylic acid or a carboxylate terminus.

13. The method of claim 11, wherein the concentration of the sensitizer molecule within the composition comprising the liquid crystal is from about 0.001 mol % to about 5.0 mol % sensitizer molecule.

14. A method for detecting the presence of chlorine in a sample comprising:
(a) contacting a substrate surface with the sample, wherein the substrate surface comprises either:
one or more metal cations capable of binding a liquid crystal strongly enough to cause homeotropic ordering of the liquid crystal in contact with the substrate surface and having an oxidized state that is not capable of binding the liquid crystal strongly enough to cause homeotropic ordering of a liquid crystal in contact with the substrate surface, wherein the one or more metal cations are capable of being oxidized to the oxidized state by chlorine gas, and wherein the one or more metal cations are not capable of being oxidized to the oxidized state by the oxygen in air; or
(ii) a metal capable of binding a mixture comprising a liquid crystal and a sensitizer molecule strongly enough to cause homeotropic ordering of such a mixture in contact with the substrate surface in the absence of chlorine, but not when chlorine atoms are dissociatively bound to the substrate surface;
(b) contacting the substrate surface with a composition comprising a liquid crystal, wherein if the substrate surface comprises the metal, the composition further comprises a sensitizing agent; and
(c) observing the orientational ordering of the liquid crystal in the device;
wherein an observed change in the orientational ordering of the liquid crystal from the expected orientational ordering of the liquid crystal in the absence of chlorine indicates that chlorine is present in the sample.

15. The method of claim 14, further comprising quantifying the amount of chlorine in the sample, wherein the quantity of chlorine in the sample is correlated with the speed or extent of the observed change in orientational ordering.

16. The method of claim 14, wherein the substrate surface comprises the one or more metal cations, and wherein the one or more metal cations include $Mn^{2+}$.

17. The method of claim 16, wherein chlorine is detected, and wherein when the chlorine contacts the substrate surface, one or more $Mn^{2+}$ cations are oxidized to $Mn^{4+}$ cations.

18. The method of claim 14, wherein the substrate surface comprises the metal, and wherein the metal is gold.

19. The method of claim 18, wherein the sensitizer molecule comprises a carboxylic acid or a carboxylate terminus.

20. The method of claim 18, wherein the concentration of the sensitizer molecule within the composition comprising the liquid crystal is from about 0.001 mol % to about 5.0 mol % sensitizer molecule.

* * * * *